United States Patent
Muraoka

(10) Patent No.: US 11,956,559 B2
(45) Date of Patent: Apr. 9, 2024

(54) IMAGING DEVICE

(71) Applicant: Sony Semiconductor Solutions Corporation, Kanagawa (JP)

(72) Inventor: Kazuhiko Muraoka, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/922,845

(22) PCT Filed: May 18, 2021

(86) PCT No.: PCT/JP2021/018718
§ 371 (c)(1),
(2) Date: Nov. 2, 2022

(87) PCT Pub. No.: WO2021/261116
PCT Pub. Date: Dec. 30, 2021

(65) Prior Publication Data
US 2023/0164453 A1    May 25, 2023

(30) Foreign Application Priority Data

Jun. 23, 2020 (JP) .................. 2020-108113

(51) Int. Cl.
*H04N 25/768* (2023.01)
*H04N 1/028* (2006.01)
(Continued)

(52) U.S. Cl.
CPC .......... *H04N 25/768* (2023.01); *H04N 1/028* (2013.01); *H04N 1/203* (2013.01); *H04N 25/53* (2023.01);
(Continued)

(58) Field of Classification Search
CPC ........ H04N 1/028; H04N 1/203; H04N 25/53; H04N 25/533; H04N 25/57; H04N 25/583; H04N 25/701; H04N 25/768
See application file for complete search history.

(56) References Cited

U.S. PATENT DOCUMENTS

| 6,028,299 A * | 2/2000 | Hirama ................ H04N 25/701 348/E3.027 |
| 6,770,860 B1 * | 8/2004 | O ......................... H04N 25/701 348/E3.027 |
| 2009/0059315 A1 * | 3/2009 | Okada ................. H04N 1/0408 358/474 |

FOREIGN PATENT DOCUMENTS

| JP | H09162381 A | 6/1997 |
| JP | H09233261 A | 9/1997 |

(Continued)

OTHER PUBLICATIONS

International Search Report (PCT/ISA/210), International Application No. PCT/JP2021/018718, dated Jul. 13, 2021.

*Primary Examiner* — Lin Ye
*Assistant Examiner* — Chriss S Yoder, III
(74) *Attorney, Agent, or Firm* — Michael Best & Friedrich LLP

(57) ABSTRACT

Imaging devices are disclosed. In one example, an imaging device includes a pixel array with light-receiving pixels that are separated pixel lines, and that accumulating electric charge in an accumulation period. An exposure controller sets time lengths of the accumulation such that the time lengths repeat in predetermined order. The accumulation period includes a first accumulation period and a second accumulation period each having a first time length, and a third accumulation period and a fourth accumulation period each having a second time length. A processor generates image data by adding pixel values based on the accumula- (Continued)

tion result in a first pixel line in the first accumulation period, the accumulation result in a second pixel line in the second accumulation period, the accumulation result in the first pixel line in the third accumulation period, and the accumulation result in the second pixel line in the fourth accumulation period.

11 Claims, 19 Drawing Sheets

(51) Int. Cl.
    *H04N 1/203*     (2006.01)
    *H04N 25/53*     (2023.01)
    *H04N 25/533*     (2023.01)
    *H04N 25/57*     (2023.01)
    *H04N 25/583*     (2023.01)
    *H04N 25/701*     (2023.01)

(52) U.S. Cl.
    CPC ......... *H04N 25/533* (2023.01); *H04N 25/583* (2023.01); *H04N 25/701* (2023.01); *H04N 25/57* (2023.01)

(56) References Cited

FOREIGN PATENT DOCUMENTS

| JP | 2009060463 A | 3/2009 |
|---|---|---|
| JP | 2016019267 A | 2/2016 |

\* cited by examiner

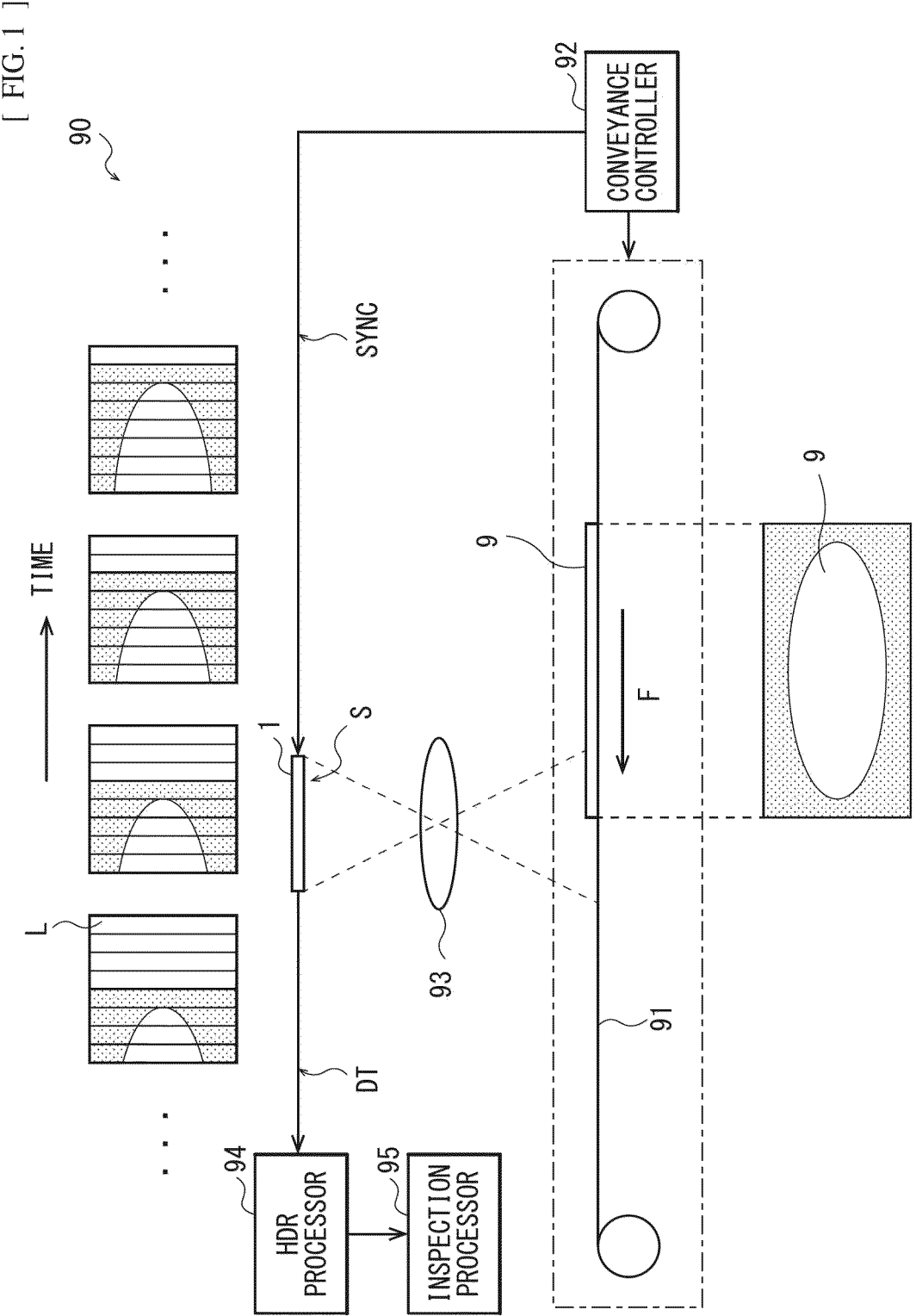
[FIG. 1]

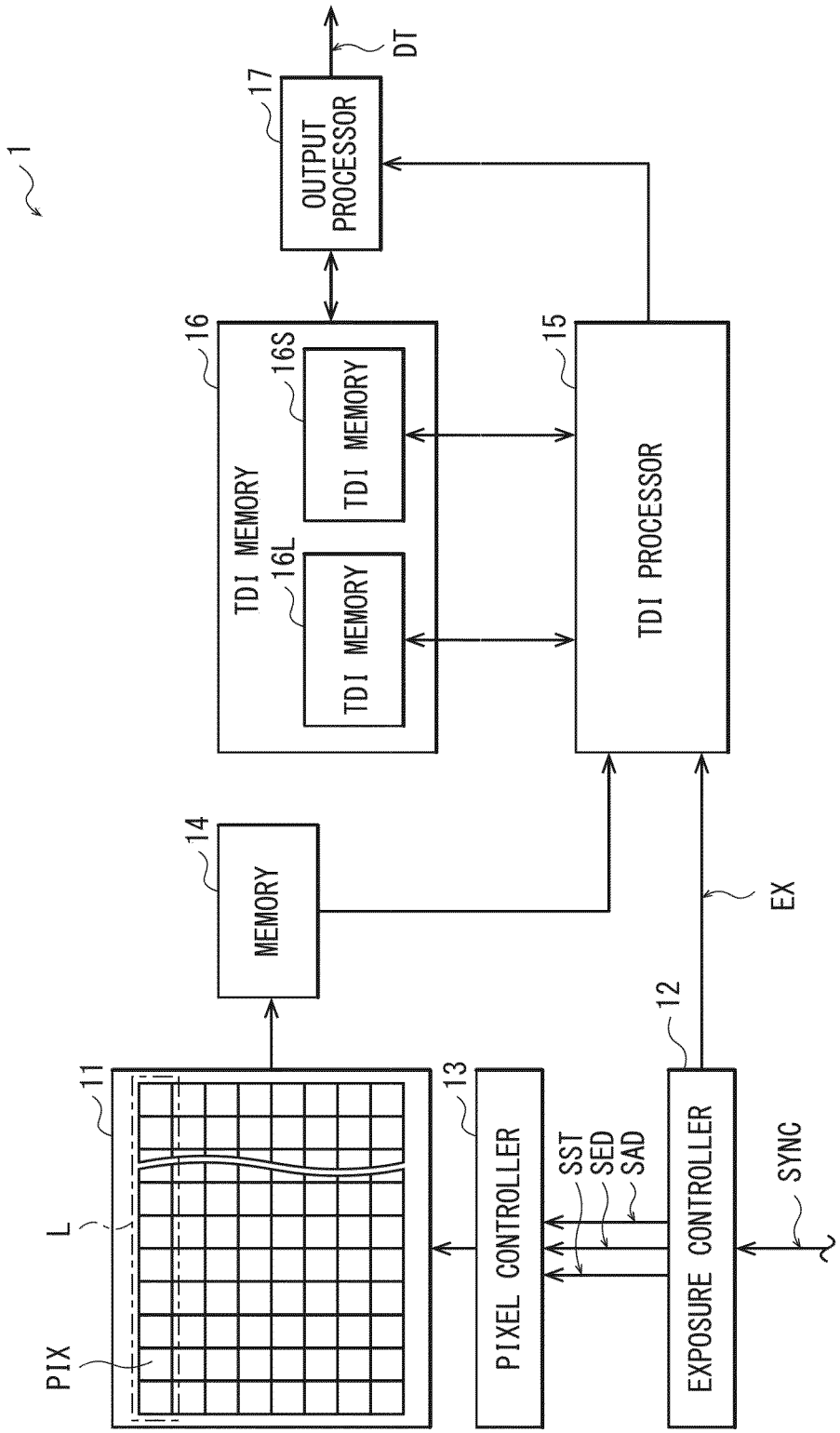
[FIG. 2]

[FIG.3]
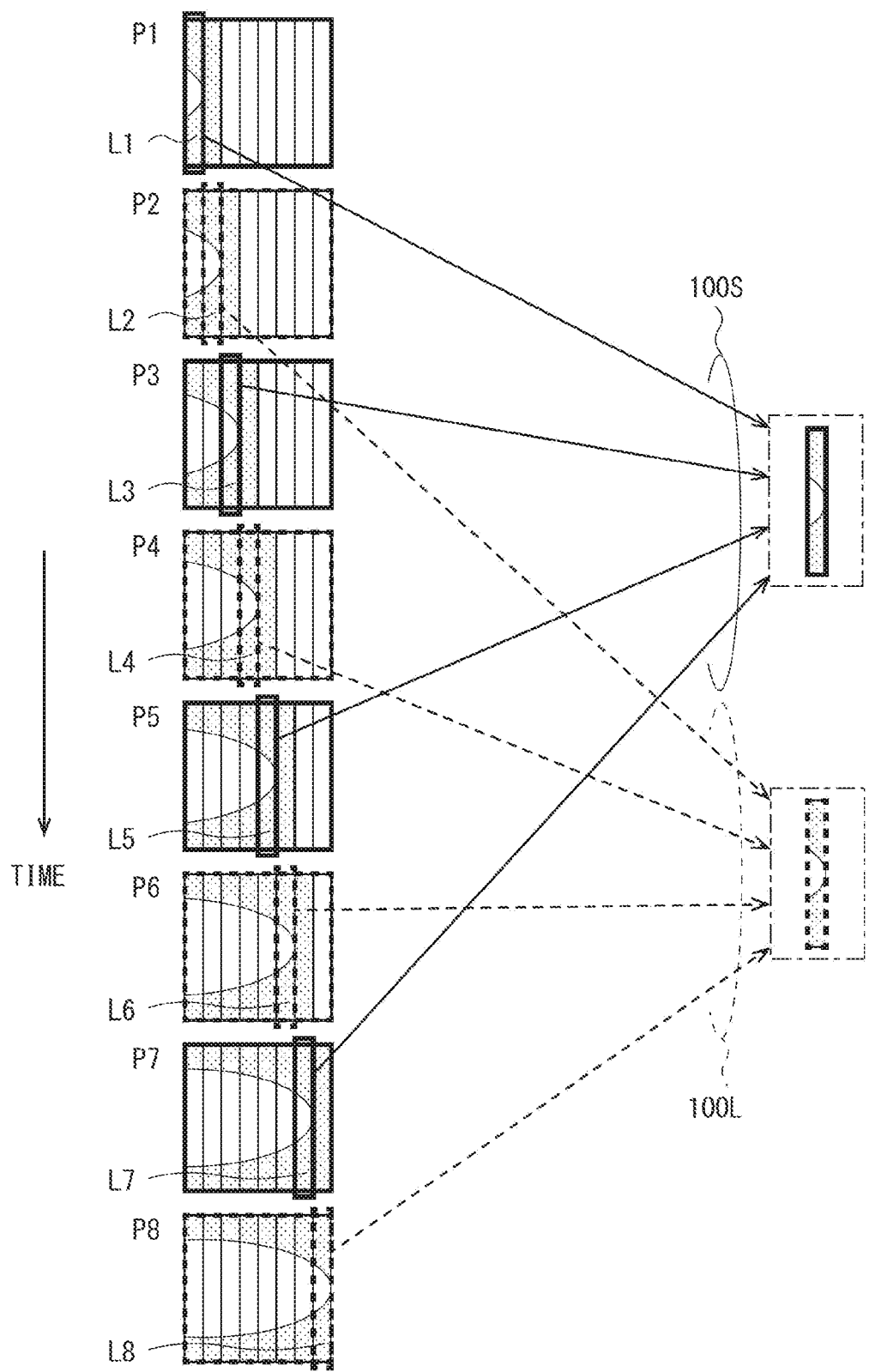

[FIG. 4A]
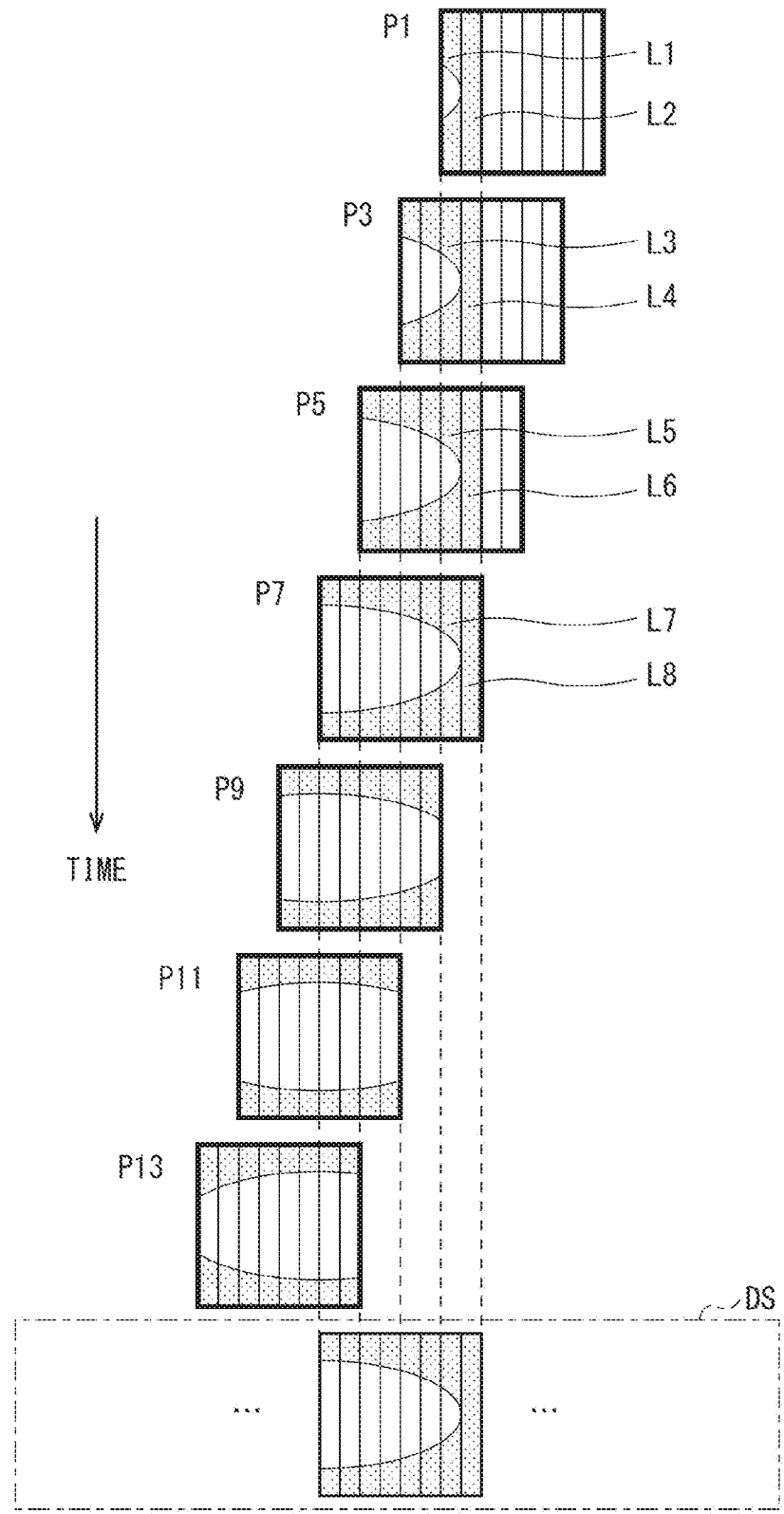

[FIG. 4B]
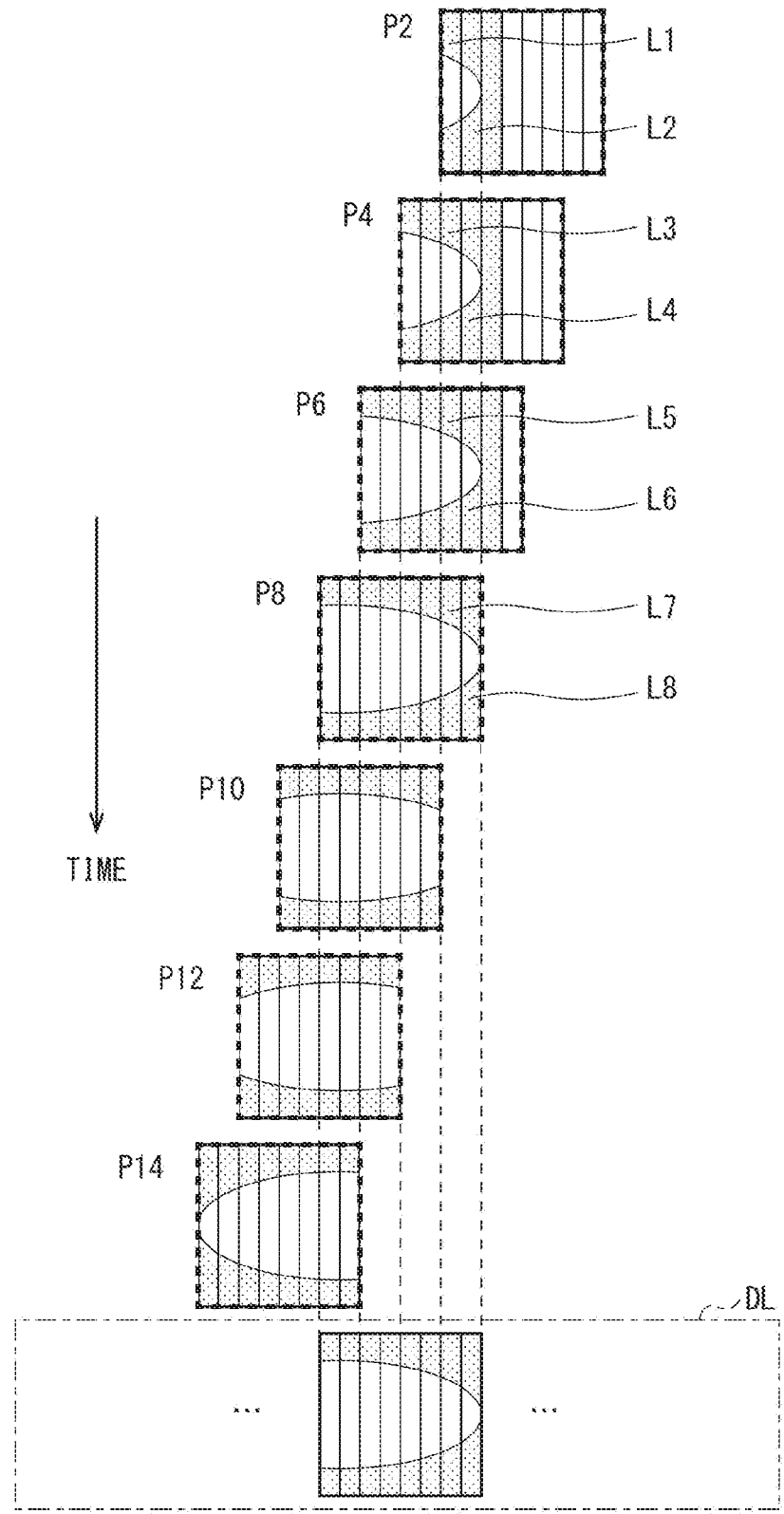

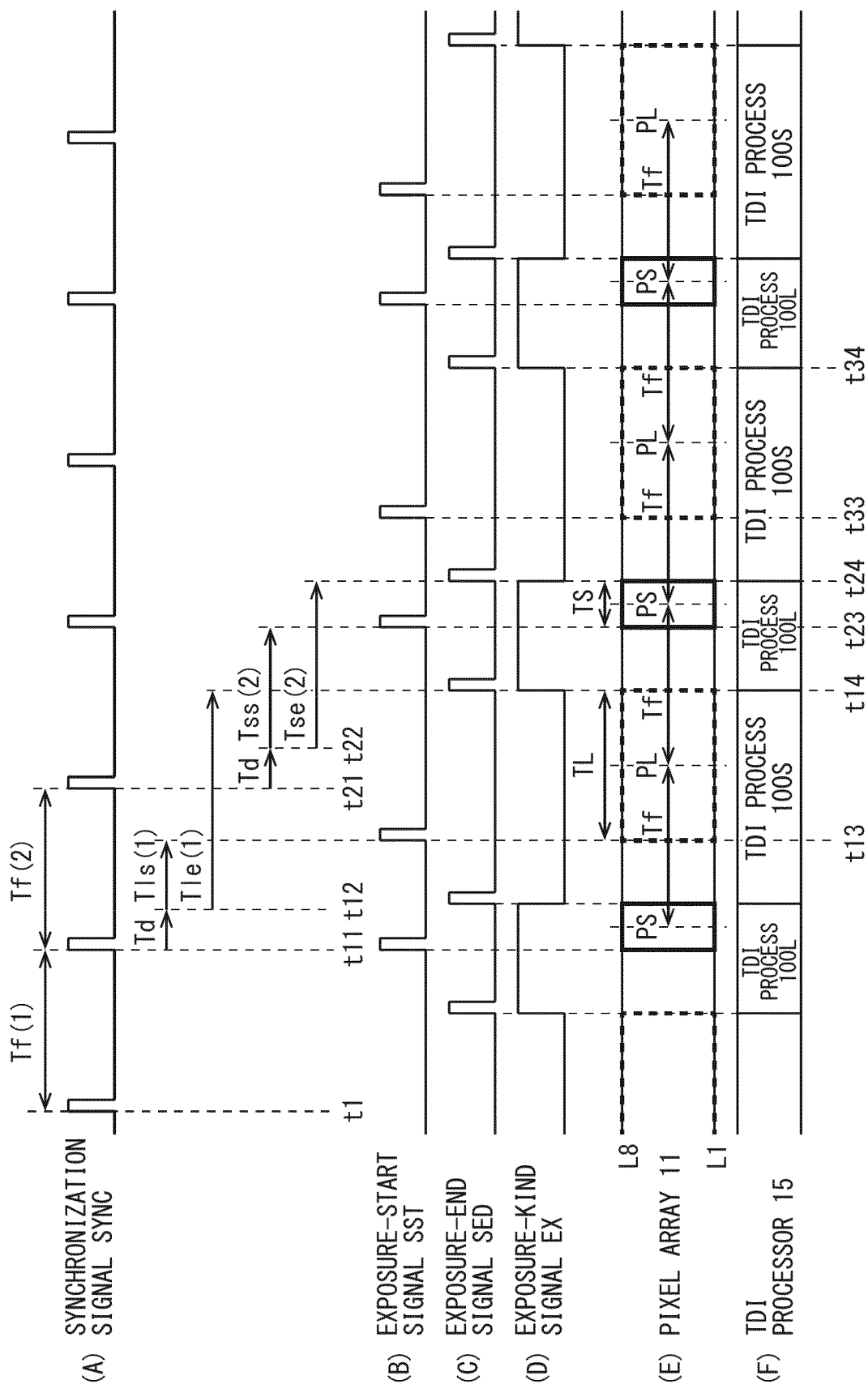
[ FIG. 5 ]

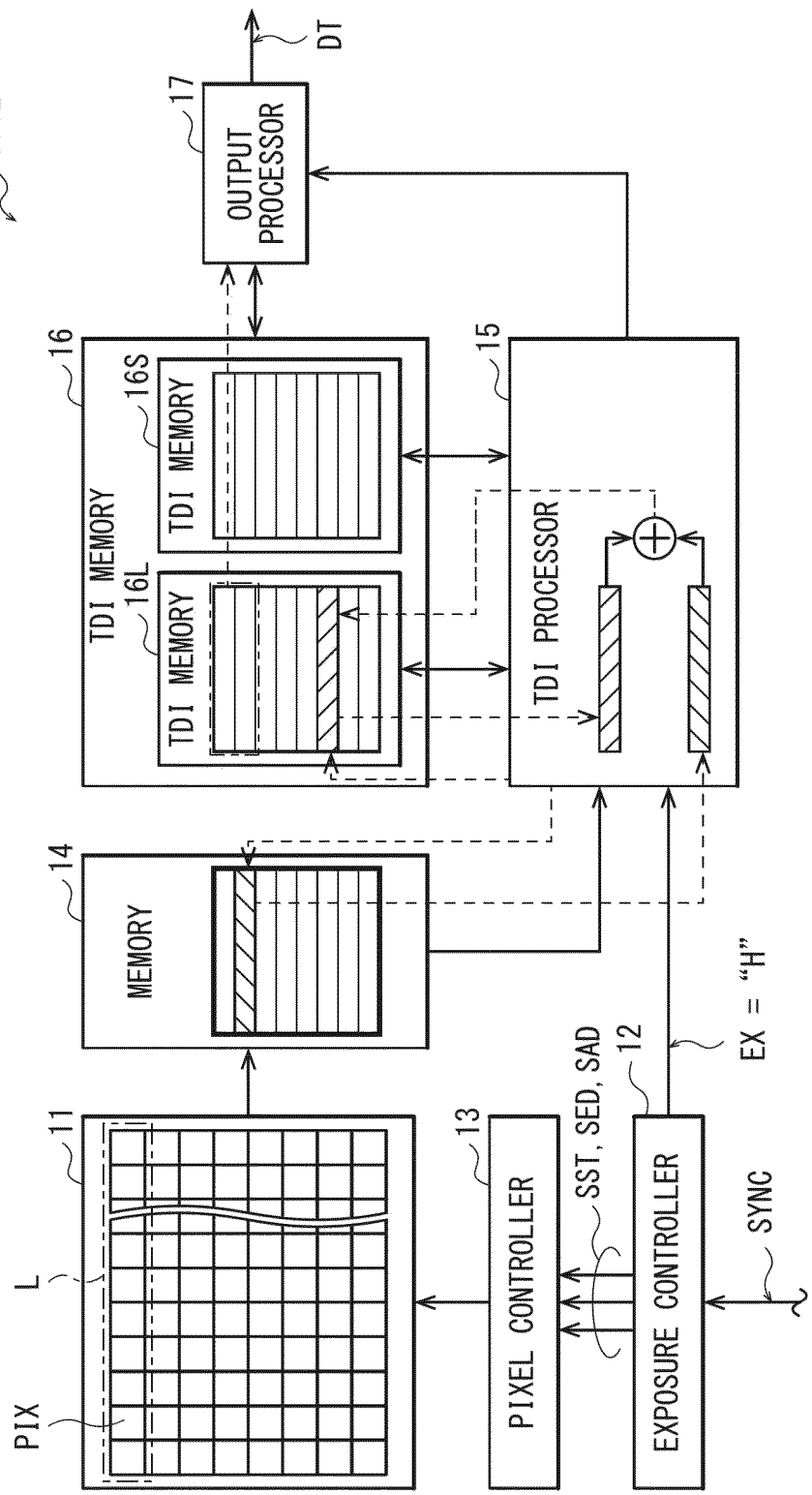

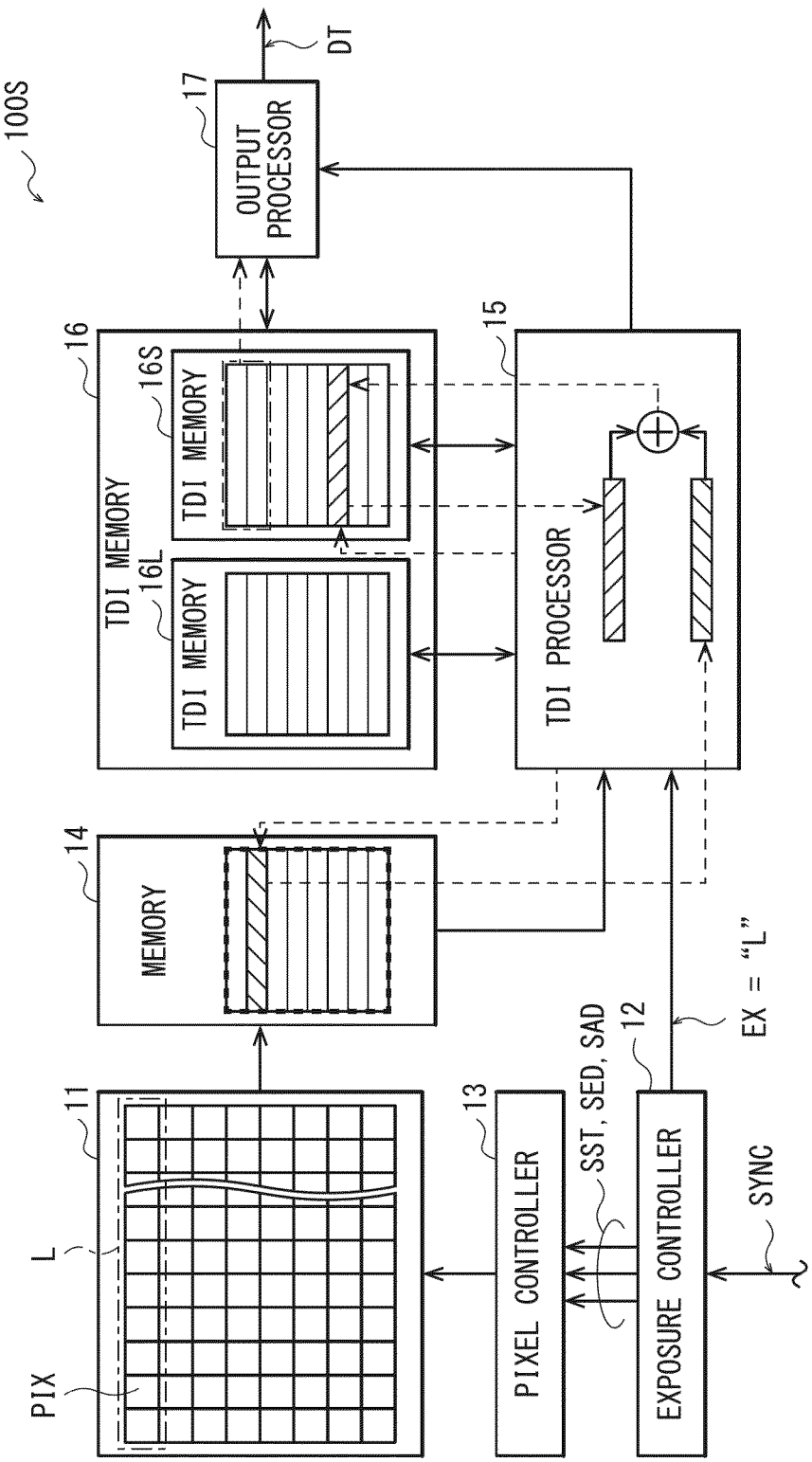
[ FIG. 6B ]

[ FIG. 7 ]
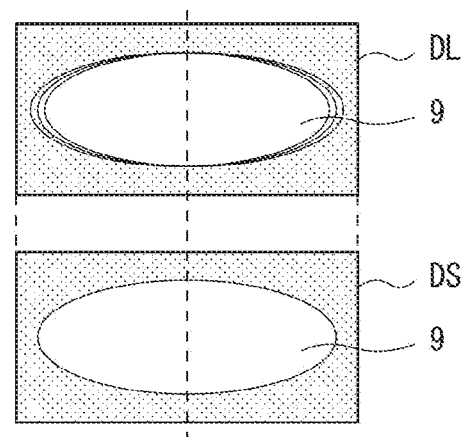

[FIG. 8]
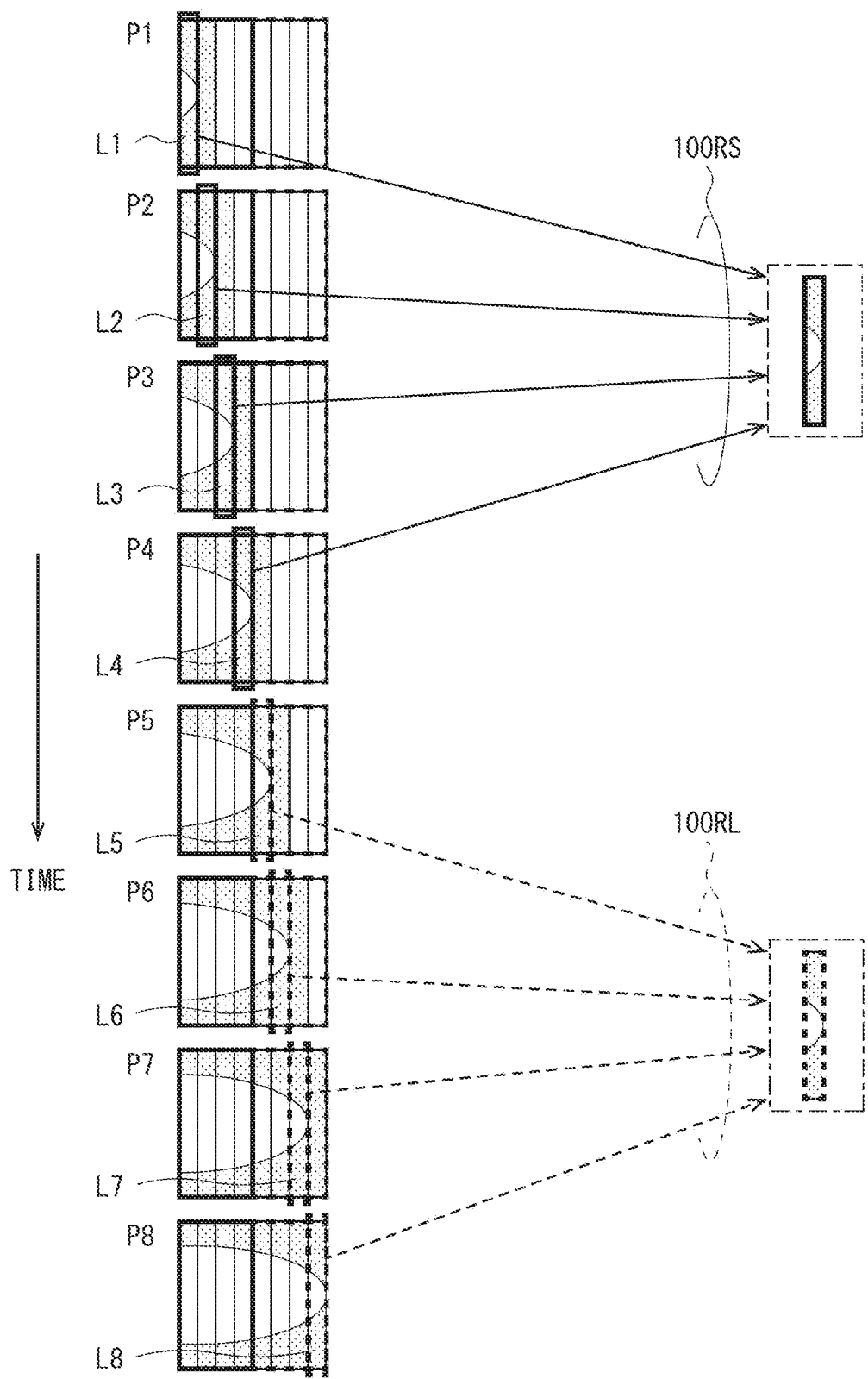

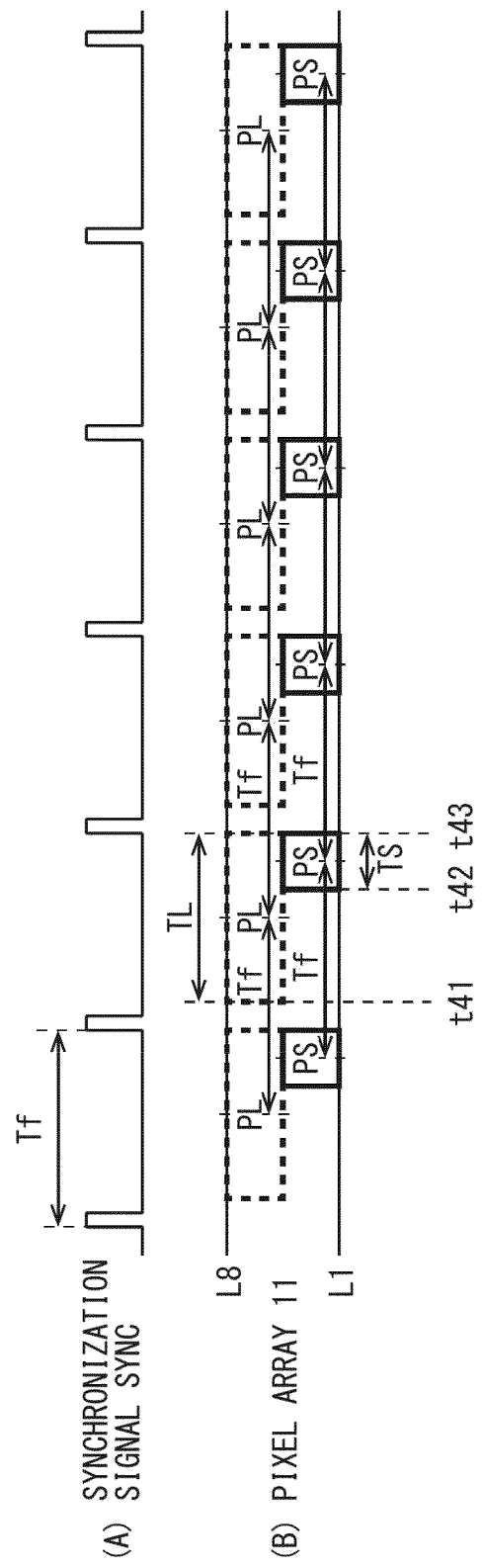
[FIG. 9]

[ FIG. 10 ]
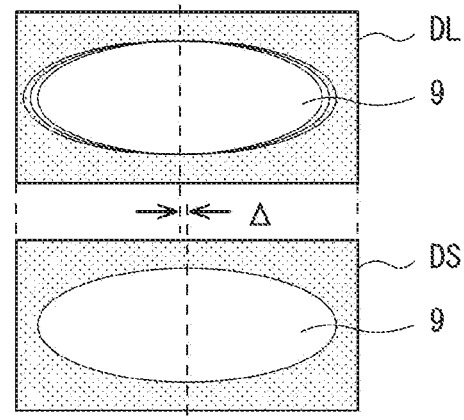

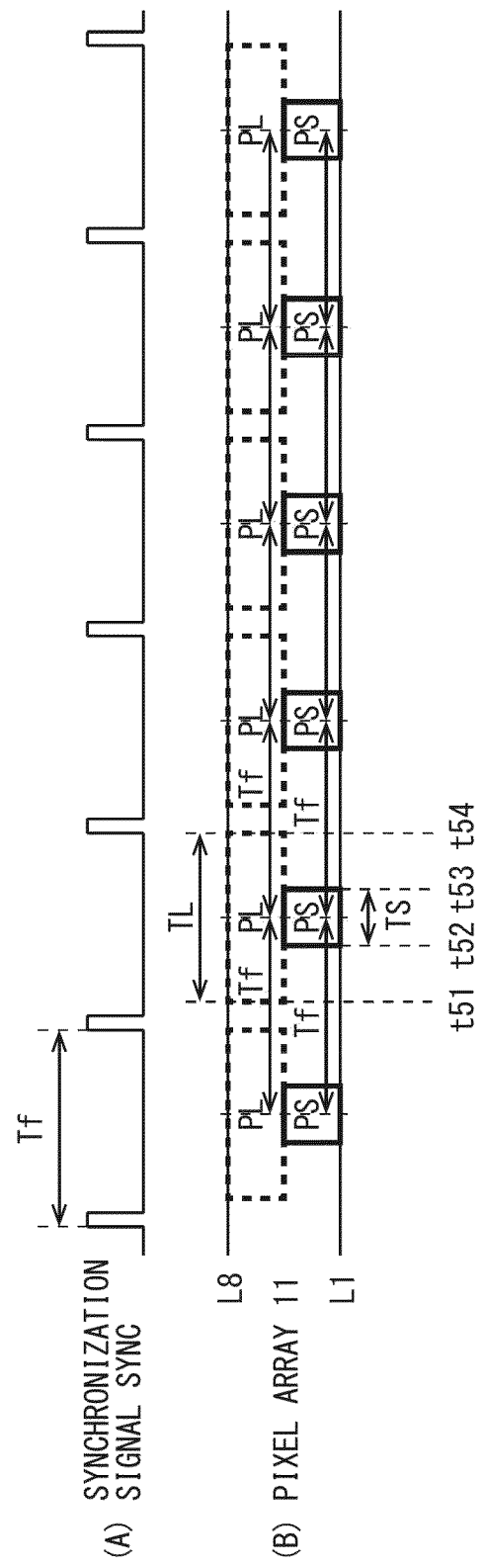

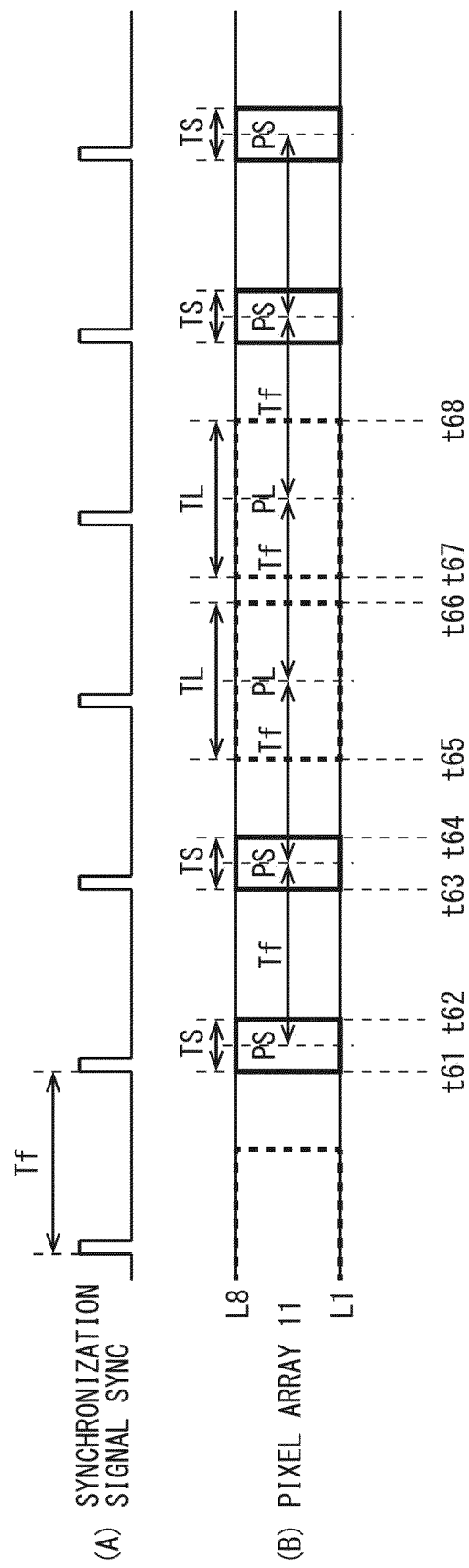

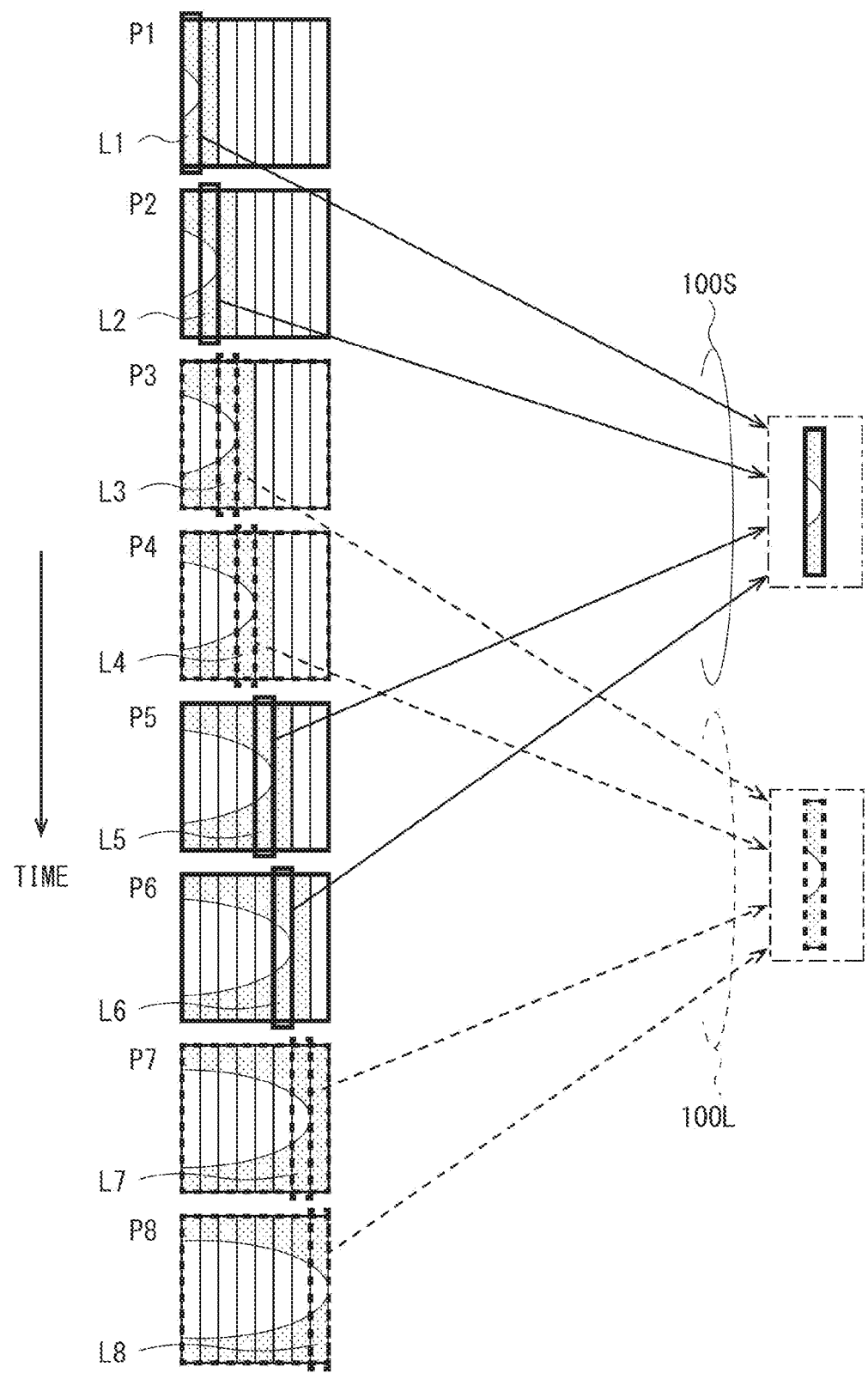
[FIG. 13]

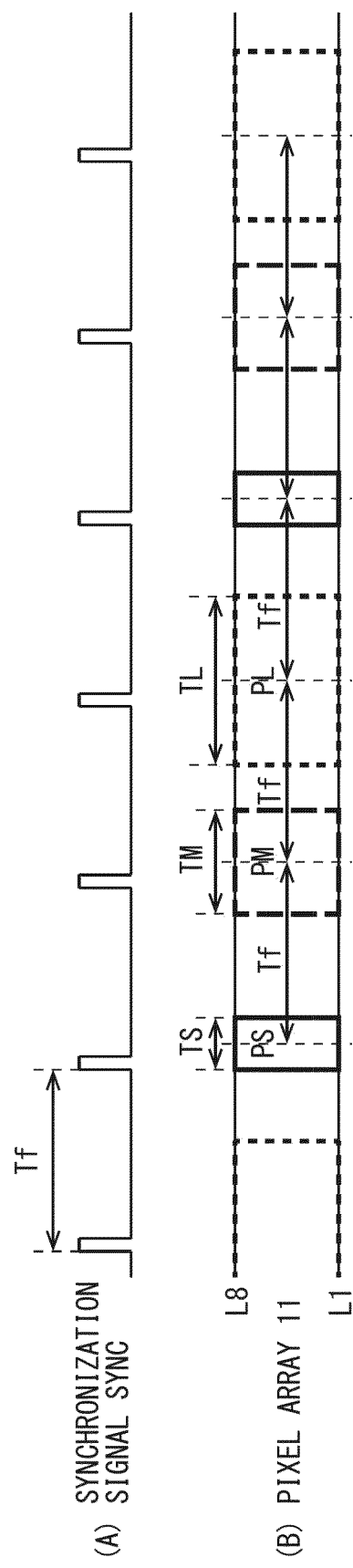
[ FIG. 14 ]

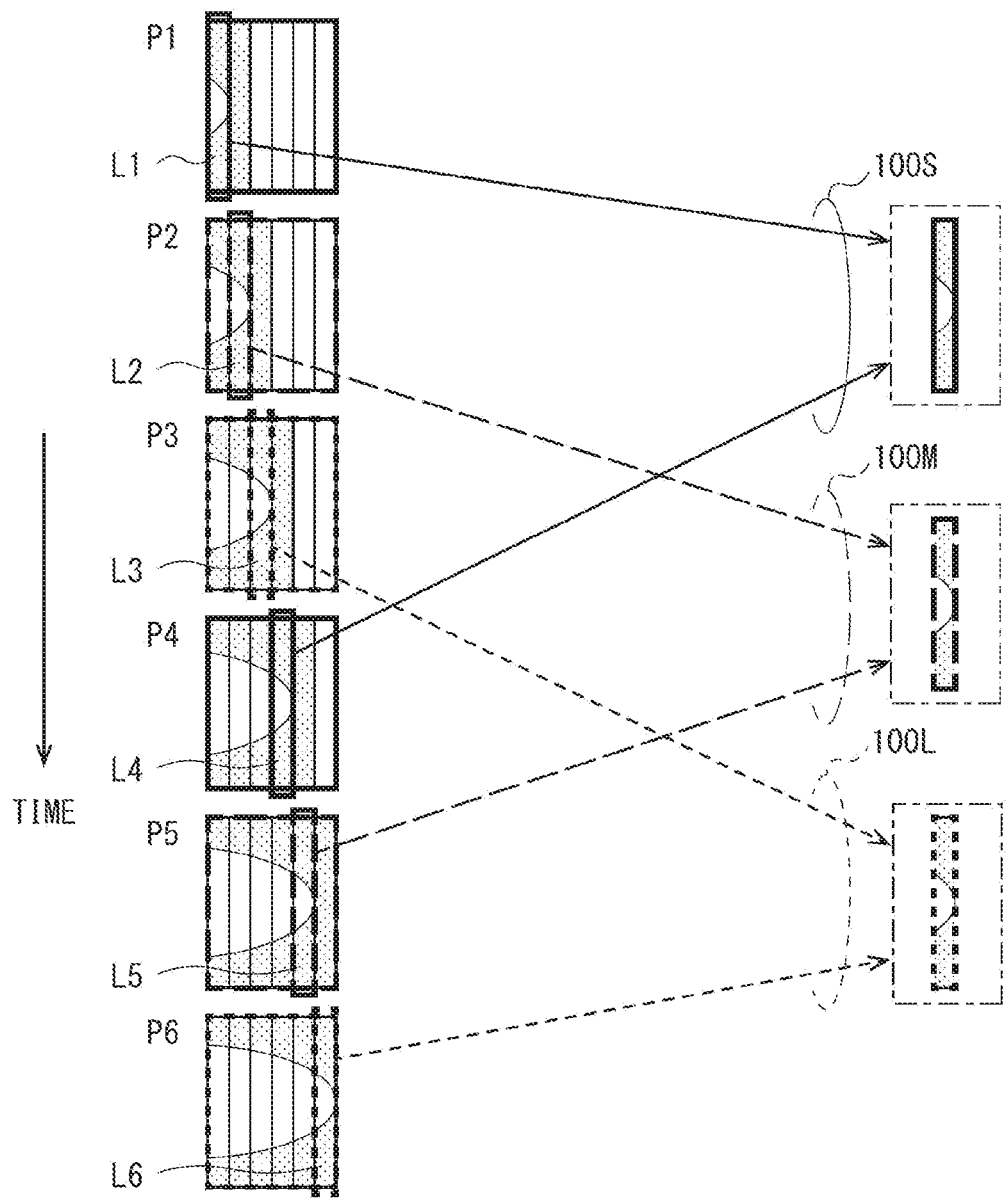
[FIG. 15]

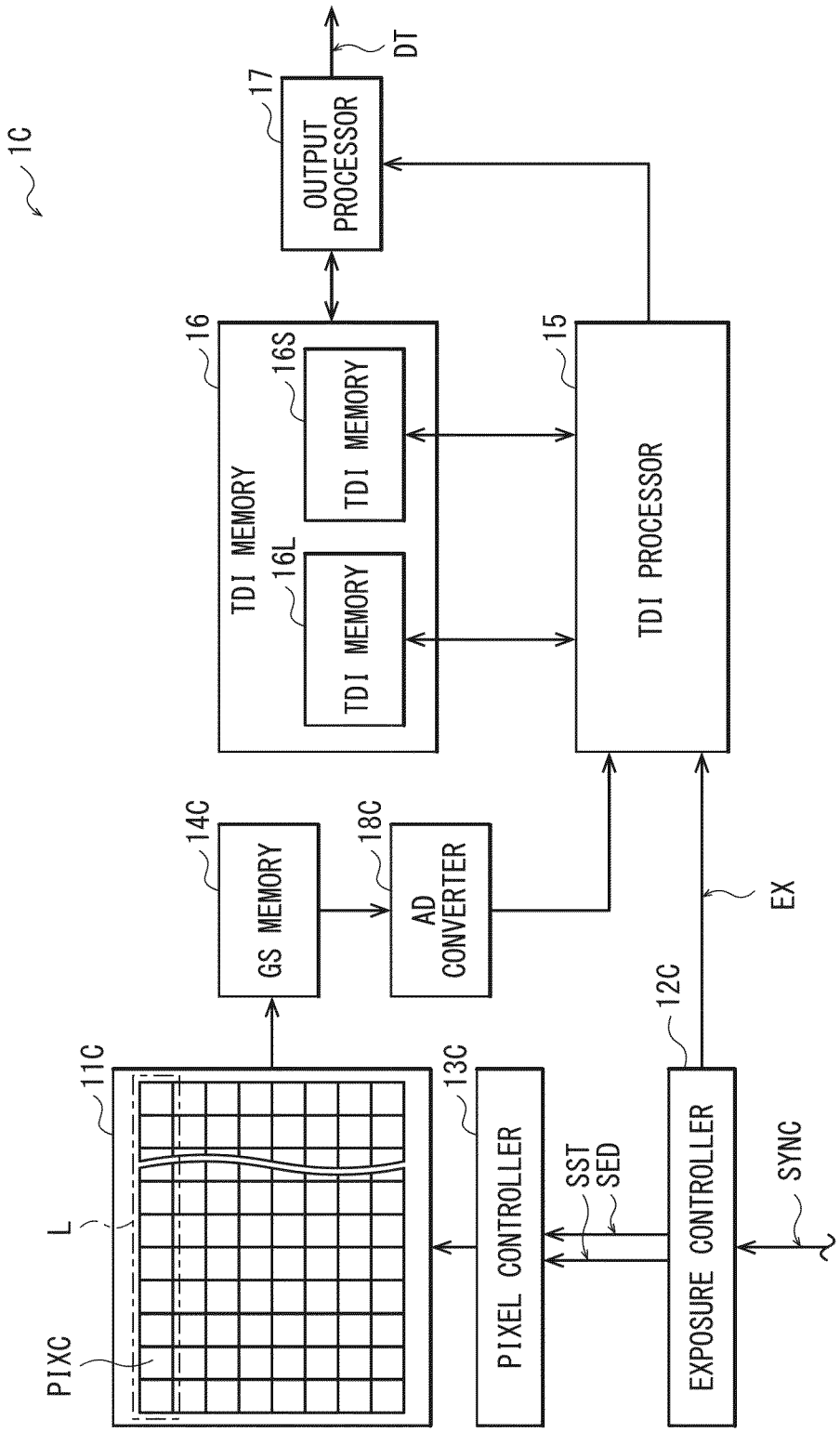
[ FIG.16 ]

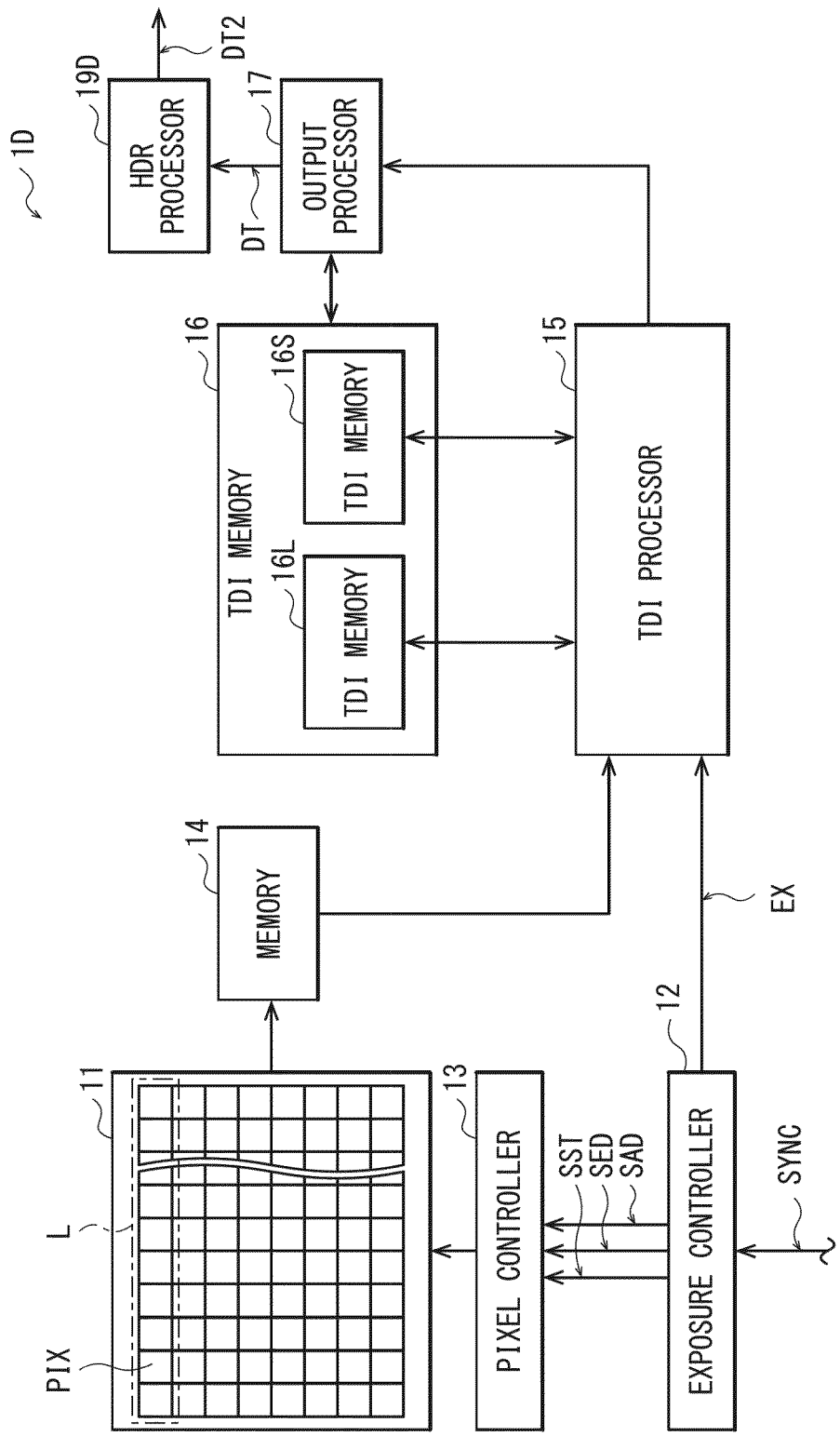
[FIG.17]

IMAGING DEVICE

TECHNICAL FIELD

The present disclosure relates to an imaging device that images a subject.

BACKGROUND ART

An imaging device includes, for example, a line sensor including one or more pixel lines. For example, PTL 1 discloses a line sensor including two or more pixel lines, in which the pixel lines have different sensitivities.

CITATION LIST

Patent Literature

PTL 1: Japanese Unexamined Patent Application Publication No. H09-162381

SUMMARY OF THE INVENTION

In a line sensor, high image quality is desired, and further improvement in image quality is expected.

It is desirable to provide an imaging device that is able enhance image quality.

An imaging device according to an embodiment of the present disclosure includes a pixel array, an exposure controller, and a processor. The pixel array includes a plurality of light-receiving pixels. The plurality of light-receiving pixels is separated into a plurality of pixel lines and accumulates electric charge corresponding to a light-receiving amount in an accumulation period. The plurality of pixel lines includes a first pixel line and a second pixel line arranged in parallel in a first direction. The exposure controller sets a time length of the accumulation period in the plurality of light-receiving pixels to one of a plurality of time lengths including a first time length and a second time length in a manner that the plurality of time lengths repeat in predetermined order. The processor generates image data on a basis of an accumulation result in the plurality of light-receiving pixels. The accumulation period includes a first accumulation period and a second accumulation period each having the first time length, and a third accumulation period and a fourth accumulation period each having the second time length. The processor generates the image data by adding a plurality of pixel values based on the accumulation result in the first pixel line in the first accumulation period and a plurality of pixel values based on the accumulation result in the second pixel line in the second accumulation period, and adding a plurality of pixel values based on the accumulation result in the first pixel line in the third accumulation period and a plurality of pixel values based on the accumulation result in the second pixel line in the fourth accumulation period.

In the imaging device according to the embodiment of the present disclosure, the time length of the accumulation period in the plurality of light-receiving pixels is set to one of the plurality of time lengths including the first time length and the second time length in the manner that the plurality of time lengths repeat in predetermined order. In the light-receiving pixel, the electric charge corresponding to the light-receiving amount is accumulated in the accumulation period. The plurality of light-receiving pixels is separated into the plurality of pixel lines including the first pixel line and the second pixel line arranged in parallel in the first direction. In the processor, the image data is generated by adding the plurality of pixel values based on the accumulation result in the first pixel line in the first accumulation period having the first time length and the plurality of pixel values based on the accumulation result in the second pixel line in the second accumulation period having the first time length, and adding the plurality of pixel values based on the accumulation result in the first pixel line in the third accumulation period and the plurality of pixel values based on the accumulation result in the second pixel line in the fourth accumulation period.

BRIEF DESCRIPTION OF DRAWINGS

FIG. 1 is an explanatory diagram illustrating a configuration example of an inspection system including an imaging device according to an embodiment of the present disclosure.

FIG. 2 is a block diagram illustrating a configuration example of the imaging device illustrated in FIG. 1.

FIG. 3 is an explanatory diagram illustrating an example of a TDI process to be performed in the imaging device illustrated in FIG. 2.

FIG. 4A is another explanatory diagram illustrating an example of the TDI process to be performed in the imaging device illustrated in FIG. 2.

FIG. 4B is another explanatory diagram illustrating an example of the TDI process to be performed in the imaging device illustrated in FIG. 2.

FIG. 5 is a timing diagram illustrating an operation example of the imaging device illustrated in FIG. 2.

FIG. 6A is another explanatory diagram illustrating an example of the TDI process to be performed in the imaging device illustrated in FIG. 2.

FIG. 6B is another explanatory diagram illustrating an example of the TDI process to be performed in the imaging device illustrated in FIG. 2.

FIG. 7 is an explanatory diagram illustrating an example of an image generated by the imaging device illustrated in FIG. 2.

FIG. 8 is an explanatory diagram illustrating an example of a TDI process to be performed in an imaging device according to a first comparative example.

FIG. 9 is a timing diagram illustrating an operation example of the imaging device according to the first comparative example.

FIG. 10 is an explanatory diagram illustrating an example of an image generated by the imaging device according to the first comparative example.

FIG. 11 is a timing diagram illustrating an operation example of an imaging device according to a second comparative example.

FIG. 12 is a timing diagram illustrating an operation example of an imaging device according to a modification example.

FIG. 13 is an explanatory diagram illustrating an example of a TDI process to be performed in the imaging device according to the modification example.

FIG. 14 is a timing diagram illustrating an operation example of an imaging device according to another modification example.

FIG. 15 is a timing diagram illustrating an operation example of an imaging device according to another modification example.

FIG. 16 is a block diagram illustrating a configuration example of an imaging device according to another modification example.

FIG. 17 is a block diagram illustrating a configuration example of an imaging device according to another modification example.

MODES FOR CARRYING OUT THE INVENTION

In the following, some embodiments of the present disclosure are described in detail with reference to the drawings.

EMBODIMENTS

Configuration Example

FIG. 1 illustrates a configuration example of an inspection system 90 including an imaging device (an imaging device 1) according to an embodiment. The inspection system 90 is configured to, for example, image an industrial product being conveyed by a belt conveyor, and perform inspection of the industrial product by utilizing an image that has been obtained. The inspection system 90 includes a belt conveyor 91, a conveyance controller 92, a lens system 93, the imaging device 1, an HDR (High Dynamic Range) processor 94, and an inspection processor 95.

The belt conveyor 91 is configured to convey the industrial product which is to be inspected along a conveyance direction F. The industrial product is a subject 9 which is to be imaged by the imaging device 1.

The conveyance controller 92 is configured to control a conveyance operation to be performed by the belt conveyor 91. Further, the conveyance controller 92 generates a synchronization signal SYNC corresponding to a conveying speed of the belt conveyor 91. The synchronization signal SYNC includes a plurality of pulses provided at intervals corresponding to the conveying speed. In this example, a pitch of the pulses is set in such a manner as to be time that is the same as time in which an image of the subject 9 progresses by one pixel line L on an imaging plane S of the imaging device 1, as will be described later. Thereafter, the conveyance controller 92 supplies the imaging device 1 with the synchronization signal SYNC.

The lens system 93 is configured to direct the image of the subject 9 to the imaging plane S of the imaging device 1. The lens system 93 is a Keplerian-type system in this example.

The imaging device 1 is a linear sensor and is configured to image the subject 9 conveyed by the belt conveyor 91 via the lens system 93. In this example, the lens system 93 is a Keplerian-type system. Thus, the subject 9 moves in a direction opposite to the conveyance direction F on the imaging plane S of the imaging device 1. The imaging device 1 performs an imaging operation in response to each of a plurality of pulses included in the synchronization signal SYNC. The imaging device 1 includes eight pixel lines L in this example as will be described later. The imaging device 1 performs the imaging operation each time the image of the subject 9 progresses by one pixel line L on the imaging plane S on the basis of the synchronization signal SYNC. The imaging device 1 is adapted to provide image data DT indicating an imaging outcome to the HDR processor 94.

The HDR processor 94 is configured to generate image data including an image having a wider dynamic range by performing an HDR process on the basis of the image data DT supplied by the imaging device 1. The HDR processor 94 thereafter supplies the inspection processor 95 with the generated image data.

The inspection processor 95 is configured to inspect the industrial product (the subject 9) on the basis of the image data supplied by the HDR processor 94.

FIG. 2 illustrates a configuration example of the imaging device 1. The imaging device 1 includes a pixel array 11, an exposure controller 12, a pixel controller 13, a memory 14, a TDI (Time Delay Integration) processor 15, a TDI memory 16, and an output processor 17.

The pixel array 11 includes a plurality of light-receiving pixels PIX arranged in a matrix. The light-receiving pixel PIX includes a photodiode. The plurality of light-receiving pixels PIX is separated into eight pixel lines L in this example. In FIG. 2, the eight pixel lines L are arranged in parallel in a vertical direction. The direction of the parallel arrangement (the vertical direction) is a direction in which the image of the subject 9 moves. Each of the eight pixel lines L includes a predetermined number of light-receiving pixels PIX. Each of the plurality of light-receiving pixels PIX is configured to perform an accumulation operation of accumulating electric charge corresponding to a light-receiving amount in an accumulation period P, and perform an AD (Analog to Digital) conversion operation of converting an analog signal corresponding to the electric charge accumulated in the accumulation period P into a pixel value which is a digital value. The accumulation operation and the AD conversion operation in the plurality of light-receiving pixels PIX are performed on the basis of an instruction from the pixel controller 13.

The exposure controller 12 is configured to control the accumulation operation and the AD conversion operation to be performed in the pixel array 11 on the basis of the synchronization signal SYNC supplied from the conveyance controller 92 (FIG. 1). Specifically, the exposure controller 12 sets, in a time-division and alternate manner, the accumulation period P (an accumulation period PL) having a long time length TL and the accumulation period P (an accumulation period PS) having a short time length TS on the basis of the synchronization signal SYNC. The exposure controller 12 thereafter generates an exposure-start signal SST indicating a start timing of the accumulation period P and an exposure-end signal SED indicating an end timing of the accumulation period P, generates a conversion-start signal SAD indicating a start timing of the AD conversion operation, and supplies the pixel controller 13 with those signals. Further, the exposure controller 12 generates an exposure-kind signal EX indicating which of a process with respect to an accumulation result in the accumulation time PL or a process with respect to an accumulation result in the accumulation time PS is to be performed, and supplies the TDI processor 15 with the exposure-kind signal EX.

The pixel controller 13 is configured to control the accumulation operation by driving the plurality of light-receiving pixels PIX included in the pixel array 11 on the basis of the exposure-start signal SST and the exposure-end signal SED supplied from the exposure controller 12, and to control the AD conversion operation by driving the plurality of light-receiving pixels PIX included in the pixel array 11 on the basis of the conversion-start signal SAD supplied from the exposure controller 12. Further, after the AD conversion operation is completed, the pixel controller 13 also has a function of controlling an operation of transferring the respective pixel values generated by the plurality of light-receiving pixels PIX to the memory 14.

The memory 14 is provided in the vicinity of pixel array 11 and is configured to temporarily store the plurality of pixel values supplied from the plurality of light-receiving pixels PIX included in the pixel array 11. The memory 14 is a logic memory that stores the same number of pixel values as the number of the plurality of light-receiving pixels PIX included in the pixel array 11.

The TDI processor 15 is configured to read the plurality of pixel values stored in the memory 14 in units of a plurality of pixel values related to one pixel line L, and to perform the TDI process on the basis of the plurality of pixel values that has been read. Specifically, the TDI processor 15 performs a TDI process 100L using pixel values based on the accumulation result in the accumulation period PL and a TDI process 100S using pixel values based on the accumulation result in the accumulation period PS.

The TDI memory 16 is a memory used by the TDI processor 15 in performing the TDI process. The TDI memory 16 includes a TDI memory 16L and a TDI memory 16S. The TDI memories 16L and 16S are each a logic memory, and are each able to store pieces of data, the number of which is the same as the number of the light-receiving pixels PIX in the pixel array 11. The TDI memory 16L stores the data generated when the TDI processor 15 performs the TDI process 100L, and the TDI memory 16S stores the data generated when the TDI processor 15 performs the TDI process 100S.

The output processor 17 is configured to generate the image data DT by reading the data from the TDI memories 16L and 16S on the basis of an instruction from the TDI processor 15.

With this configuration, the exposure controller 12 sets the accumulation period PL having the long time length TL and the accumulation period PS having the short time length TS in the time-division and alternate manner. Then, in each accumulation period P, the plurality of light-receiving pixels PIX performs the accumulation operation, and thereafter performs the AD conversion operation, to thereby generate the pixel values. The TDI processor 15 performs the TDI process 100L using the pixel values based on the accumulation result in the accumulation period PL and the TDI process 100S using the pixel values based on the accumulation result in the accumulation period PS. The imaging device 1 is thus able to widen the dynamic range.

The pixel array 11 corresponds to a specific example of a "pixel array" according to the present disclosure. The light-receiving pixel PIX corresponds to a specific example of a "light-receiving pixel" according to the present disclosure. The pixel line L corresponds to a specific example of a "pixel line" according to the present disclosure. The exposure controller 12 corresponds to a specific example of an "exposure controller" according to the present disclosure. The TDI processor 15, the TDI memory 16, and the output processor 17 correspond to a specific example of a "processor" according to the present disclosure. The TDI memory 16S corresponds to a specific example of a "first storage" according to the present disclosure. The TDI memory 16L corresponds to a specific example of a "second storage" according to the present disclosure. The accumulation period P corresponds to a specific example of an "accumulation period" according to the present disclosure. The time length TS corresponds to a specific example of a "first time length" according to the present disclosure. The time length TL corresponds to a specific example of a "second time length" according to the present disclosure. The synchronization signal SYNC corresponds to a specific example of a "synchronization signal" according to the present disclosure.

Operations and Workings

Next, operations and workings of the imaging device 1 according to the present embodiment will be described.

(Outline of Overall Operation)

First, with reference to FIG. 2, an outline of overall operation of the imaging device 1 will be described. The exposure controller 12 sets, in the time division manner, the accumulation period PL having the long time length TL and the accumulation period PS having the short time length TS on the basis of the synchronization signal SYNC. Thereafter, the exposure controller 12 generates the exposure-start signal SST, the exposure-end signal SED, the conversion-start signal SAD, and the exposure-kind signal EX. The pixel controller 13 controls the accumulation operation of the plurality of light-receiving pixels PIX included in the pixel array 11 on the basis of the exposure-start signal SST and the exposure-end signal SED, and controls the AD conversion operation the plurality of light-receiving pixels PIX included in the pixel array 11 on the basis of the conversion-start signal SAD. Each of the plurality of light-receiving pixels PIX included in the pixel array 11 performs the accumulation operation of accumulating the electric charge corresponding to the light-receiving amount in the accumulation period P, and performs the AD conversion operation of converting the analog signal corresponding to the accumulated electric charge into the pixel value which is the digital value. The memory 14 temporarily stores the plurality of pixel values supplied from the plurality of light-receiving pixels PIX included in the pixel array 11. The TDI processor 15 reads the plurality of pixel values stored in the memory 14 in units of the plurality of pixel values related to one pixel line L, and performs the TDI process 100L using the pixel values based on the accumulation result in the accumulation period PL and the TDI process 100S using the pixel values based on the accumulation result in the accumulation period PS. The TDI memory 16L stores the data generated when the TDI processor 15 performs the TDI process 100L, and the TDI memory 16S stores the data generated when the TDI processor 15 performs the TDI process 100S. The output processor 17 generates the image data DT by reading the data from the TDI memories 16L and 16S on the basis of the instruction from the TDI processor 15.

(Detailed Operation)

FIGS. 3, 4A, and 4B each illustrate an example of the TDI process to be performed in the TDI processor 15. FIG. 3 illustrates an example of the TDI process for a line image related to one pixel line L, FIG. 4A illustrates an example of the TDI process 100S based on the accumulation result in the accumulation time PS, and FIG. 4B illustrates an example of the TDI process 100L based on the accumulation result in the accumulation time PL.

The exposure controller 12 sets the accumulation period P each time the image of the subject 9 progresses by one pixel line L on the imaging plane S on the basis of the synchronization signal SYNC. As illustrated in FIG. 3, the pixel array 11 generates images P1 to P8 on the basis of the respective accumulation results in the eight accumulation periods P that have been set sequentially. In the images P1 to P8, the subject 9 progresses rightward in FIG. 3 in units of one pixel line L as time elapses. For example, the line image related to the pixel line L1 in the image P1, the line image related to the pixel line L2 in the image P2, the line image related to the pixel line L3 in the image P3, the line image related to the pixel line L4 in the image P4, the line image related to the pixel line L5 in the image P5, the line image related to the pixel line L6 in the image P6, the line image related to the pixel line L7 in the image P7, and the line image related to the pixel line L8 in the image P8 each indicate the same portion in the subject 9.

The exposure controller 12 sets the accumulation period PL having the long time length TL and the accumulation period PS having the short time length TS in the time-division and alternate manner. In FIG. 3, the images P1, P3, P5, and P7 each enclosed by a solid line are each an image generated on the basis of the accumulation result in the accumulation period PS having the short time length TS, and the images P2. P4, P6, and P8 each enclosed by a dashed line are each an image generated on the basis of the accumulation result in the exposure time PL having the long time length TL.

The TDI processor 15 performs the TDI process 100S using the pixel values based on the accumulation result in the accumulation period PS. In this example, the TDI processor 15 performs the TDI process 100S by adding, in units of pixels, the line image related to the most upstream pixel line L1 in the image P1, the line image related to the third pixel line L3 in the image P3, the line image related to the fifth pixel line L5 in the image P5, and the line image related to the seventh pixel line L7 in the image P7. This allows the imaging device 1 to obtain a line image having high sensitivity related to the accumulation period PS having the short time length TS.

In a similar manner, the TDI processor 15 performs the TDI process 100L using the pixel values based on the accumulation result in the accumulation period PL. In this example, the TDI processor 15 performs the TDI process 100L by adding, in units of pixels, the line image related to the second pixel line L2 in the image P2, the line image related to the fourth pixel line L4 in the image P4, the line image related to the sixth pixel line L6 in the image P6, and the line image related to the most downstream pixel line L8 in the image P8. This allows the imaging device 1 to obtain a line image having high sensitivity related to the accumulation period PL having the long time length TL.

In the above description, one pixel line L is focused on each of the images P1 to P8; however, it is similar for other pixel lines L.

For example, as illustrated in FIG. 4A, the TDI processor 15 performs the TDI process 100S on the basis of images P1, P3, P5, P7, P9, P11, and P13 related to the accumulation period PS having the short time length TS. Specifically, the TDI processor 15 performs the TDI process 100S on the basis of the line image related to the first pixel line L1 in the image P1, the line image related to the third pixel line L3 in the image P3, the line image related to the fifth pixel line L5 in the image P5, and the line image related to the seventh pixel line L7 in the image P7. Thereafter, the TDI processor 15 performs the TDI process 100S on the basis of the line image related to the second pixel line L2 in the image P1, the line image related to the fourth pixel line L4 in the image P3, the line image related to the sixth pixel line L6 in the image P5, and the line image related to the eighth pixel line L8 in the image P7. In this manner, the TDI processor 15 generates a two-line line image on the basis of the images P1, P3, P5, and P7. In a similar manner, the TDI processor 15 generates the two-line line image on the basis of the images P3, P5, P7, and P9, generates the two-line line image on the basis of the images P5, P7, P9, and P11, and generates the two-line line image on the basis of the images P7, P9, P11, and P13. In this manner, the imaging device 1 is able to obtain an image DS having high sensitivity related to the accumulation period PS having the short time length TS.

In a similar manner, for example, as illustrated in FIG. 4B, the TDI processor 15 performs the TDI process 100L on the basis of images P2, P4, P6, P8, P10, P12, and P14 related to the accumulation period PL having the long time length TL. Specifically, the TDI processor 15 performs the TDI process 100L on the basis of the line image related to the first pixel line L1 in the image P2, the line image related to the third pixel line L3 in the image P4, the line image related to the fifth pixel line L5 in the image P6, and the line image related to the seventh pixel line L7 in the image P8. Thereafter, the TDI processor 15 performs the TDI process 100L on the basis of the line image related to the second pixel line L2 in the image P2, the line image related to the fourth pixel line L4 in the image P4, the line image related to the sixth pixel line L6 in the image P6, and the line image related to the eighth pixel line L8 in the image P8. In this manner, the TDI processor 15 generates the two-line line image on the basis of the images P2, P4, P6, and P8. In a similar manner, the TDI processor 15 generates the two-line line image on the basis of the images P4, P6, P8, and P10, generates the two-line line image on the basis of the images P6, P8, P10, and P12, and generates the two-line line image on the basis of the images P8, P10, P12, and P14. In this manner, the imaging device 1 is able to obtain an image DL having high sensitivity related to the accumulation period PL having the long time length TL.

If the accumulation period P is the accumulation period PS having the short time length TS, the pixel array 11 is able to image a bright portion of the subject 9 with high image quality, for example. Further, if the accumulation period P is the accumulation period PL having the long time length TL, the pixel array 11 is able to image a dark portion of the subject 9 with high image quality, for example. Accordingly, the imaging device 1 is able to achieve a wide dynamic range.

The imaging device 1 outputs, as the image data DT, the image DS related to the accumulation period PS and the image DL related to the accumulation period PL that have been generated by such a TDI process. Thereafter, the HDR processor 94 combines the image DS related to the accumulation period PS and the image DL related to the accumulation period PL by the HDR process. In other words, in the image DS related to the accumulation period PS having the short time length TS, for example, information of the dark portion in the subject 9 is missing, and in the image DL related to the accumulation period PL having the long time length TL, for example, information of the bright portion in the subject 9 is missing. The HDR processor 94 is able to combine the images DS and DL by, for example, causing the two images DS and DL to mutually compensate for the missing information, and selecting image portions whose S/N ratio is satisfactory from the two images DS and DL. This makes it possible for the HDR processor 94 to generate an image having a wide dynamic range. Thereafter, the inspection processor 95 inspects the industrial product (the subject 9) on the basis of the image having the wide dynamic range combined by the HDR processor 94. As a result, the inspection system 90 is able to increase accuracy of the industrial-product inspection.

Next, more detailed operation of the imaging device 1 will be described.

FIG. 5 illustrates an operation example of the imaging device 1, in which (A) indicates a waveform of the synchronization signal SYNC, (B) indicates a waveform of the exposure-start signal SST, (C) indicates a waveform of the exposure-end signal SED, (D) indicates a waveform of the exposure-kind signal EX, (E) indicates the accumulation operation performed in the pixel array 11, and (F) indicates the processes performed in the TDI processor 15.

The conveyance controller 92 (FIG. 1) controls the conveyance operation in the belt conveyor 91 and generates the synchronization signal SYNC corresponding to the conveying speed of the belt conveyor 91 (FIG. 5(A)). A pitch (a synchronization interval Tf) of the plurality of pulses in the synchronization signal SYNC is set in such a manner as to be the time that is the same as the time in which the image of the subject 9 progresses by one pixel line L on the imaging plane S of the imaging device 1. The conveyance controller 92 maintains the conveying speed of the belt conveyor 91 at a constant speed and generates the pulses in the synchronization signal SYNC at a constant pitch (the synchronization interval Tf).

In this example, as illustrated in FIG. 5(A), the conveyance controller 92 generates the pulse of the synchronization signal SYNC at timing t1, generates the next pulse of the synchronization signal SYNC at timing t11 at which time has elapsed from timing t1 by a synchronization interval Tf(1), and generates the next pulse of the synchronization signal SYNC at timing t21 at which time has elapsed from timing t11 by a synchronization interval Tf(2).

The exposure controller 12 generates the exposure-start signal SST, the exposure-end signal SED, and the exposure-kind signal EX, on the basis of a timing at which a delay time Td has elapsed from a timing of a rising edge of the synchronization signal SYNC as a reference timing. The delay time Td includes a processing delay time necessary for implementation. The delay time Td may be intentionally set to a predetermined time. Specifically, for example, it is possible to set the delay time Td in such a manner that the timing of the rising edge of synchronization signal SYNC coincides with the central timing of the accumulation period P.

First, the exposure controller 12 sets, as the reference timing, timing t12 at which the delay time Td has elapsed from timing t11 which is the rising edge of the synchronization signal SYNC, generates a pulse of the exposure-start signal SST at timing t13 at which time Tls(1) has elapsed from the reference timing (FIG. 5(B)), and generates a pulse of the exposure-end signal SED at timing t14 at which time tle(1) has elapsed from the reference timing (FIG. 5(C)). In this manner, the accumulation period PL having the long time length TL is set in a period from timing t13 to timing t14 (FIG. 5(E)). In the pixel array 11, the accumulation period PL is set at the same timing in all pixel lines L from the most upstream pixel line L1 to the most downstream pixel line L8. Each light-receiving pixel PIX performs the accumulation operation of accumulating the electric charge corresponding to the light-receiving amount in the accumulation period PL, and performs the AD conversion operation of converting the analog signal corresponding to the accumulated electric charge into the pixel value which is the digital value in a predetermined period after the accumulation period PL is completed. The memory 14 stores the plurality of pixel values related to the accumulation period PL obtained in the plurality of light-receiving pixels PIX.

The exposure controller 12 generates the exposure-kind signal EX by performing a toggle operation at a timing of a rising edge of the exposure-end signal SED (FIG. 5(D)). In this example, the exposure controller 12 changes the exposure-kind signal EX from a low level to a high level on the basis of the rising edge of the exposure-end signal SED at timing t14. On the basis of the exposure-kind signal EX, the TDI processor 15 performs the TDI process 100L using the plurality of pixel values related to the accumulation period PL stored in the memory 14 in a period from timing t14 to timing t24 (FIG. 5 (F)).

FIG. 6A illustrates an example of the TDI process 100L. The TDI processor 15 sequentially reads the plurality of pixel values of one line corresponding to one pixel line L in the memory 14 in units of lines. Further, the TDI processor 15 reads a plurality of values of one line in the TDI memory 16L corresponding to data of one line read from the memory 14. The data of the one line read from the memory 14 and the data of the one line read from the TDI memory 16L are each data indicating the same portion of the subject 9. The TDI processor 15 generates a plurality of values by adding the plurality of pixel values of the one line read from the memory 14 and the plurality of values of the one line read from the TDI memory 16L in units of pixels. The TDI processor 15 thereafter writes the generated plurality of values in the line read in the TDI memory 16L. The TDI processor 15 thus updates data of eight lines in the TDI memory 16L.

In this example, the TDI processor 15 processes data of one line in the TDI memory 16L by reading the plurality of pixel values for each one line from the memory 14; however, the example is not limited thereto. Alternatively, for example, the TDI processor 15 may process data of two lines in the TDI memory 16L by reading the plurality of pixel values for each two lines from the memory 14.

When such a TDI process 100L is completed, data of eight lines in the TDI memory 16L includes data of two lines that has been added four times, data of two lines that has been added three times, data of two lines that has been added twice, and data of two lines that has been added once. The output processor 17 reads the data of two lines that has been added four times among the data of eight lines, and outputs the read data as the image data DT. In other words, as illustrated in FIGS. 3 and 4A, four line images are added to thereby complete the TDI process 100L related to the line images, and thus, the output processor 17 outputs the data of the two lines added four times as the image data DT. Thereafter, the TDI processor 15 resets the data of the two lines in the TDI memory 16L read by the output processor 17. It is to be noted that, in this example, the data of the two lines has been reset; however, the example is not limited thereto. Alternatively, for example, instead of resetting, next, when updating the data of the two lines in the TDI memory 16L, the data read from the memory 14 may not be added and may be written in the TDI memory 16L as it is.

In a similar manner, as illustrated in FIG. 5, the exposure controller 12 sets, as the reference timing, timing t22 at which the delay time Td has elapsed from timing t21 which is the rising edge of the synchronization signal SYNC, generates a pulse of the exposure-start signal SST at timing t23 at which time Tss(2) has elapsed from the reference timing (FIG. 5(B)), and generates a pulse of the exposure-end signal SED at timing t24 at which time tse(2) has elapsed from the reference timing (FIG. 5(C)). In this manner, the accumulation period PS having the short time length TS is set in a period from timing t23 to timing t24 (FIG. 5(E)). In the pixel array 11, the accumulation period PS is set at the same timing in all pixel lines L from the most upstream pixel line L1 to the most downstream pixel line L8. Each light-receiving pixel PIX performs the accumulation operation of accumulating the electric charge corresponding to the light-receiving amount in the accumulation period PS, and performs the AD conversion operation of converting the analog signal corresponding to the accumulated electric charge into the pixel value which is the digital value in a predetermined period after the accumulation period PS is completed. The memory 14 stores the plurality of pixel values related to the accumulation period PS obtained in the plurality of light-receiving pixels PIX.

The exposure controller 12 changes the exposure-kind signal EX from the high level to the low level on the basis of the rising edge of the exposure-end signal SED at timing t24. On the basis of the exposure-kind signal EX, the TDI processor 15 performs the TDI process 100S using the plurality of pixel values related to the accumulation period PS stored in the memory 14 in a period from timing t24 to timing t34 (FIG. 5 (F)).

FIG. 6B illustrates an example of the TDI process 100S. The TDI processor 15 sequentially reads the plurality of pixel values of one line corresponding to one pixel line L in the memory 14 in units of lines. Further, the TDI processor 15 reads a plurality of values of one line in the TDI memory 16S corresponding to data of one line read from the memory 14. The data of the one line read from the memory 14 and the data of the one line read from the TDI memory 16S are each data indicating the same portion of the subject 9. The TDI processor 15 generates a plurality of values by adding the plurality of pixel values of the one line read from the memory 14 and the plurality of values of the one line read from the TDI memory 16S in units of pixels. The TDI processor 15 thereafter writes the generated plurality of values in the line read in the TDI memory 16S. The TDI processor 15 thus updates data of eight lines in the TDI memory 16S.

When such a TDI process 100S is completed, data of eight lines in the TDI memory 16S includes data of two lines that has been added four times, data of two lines that has been added three times, data of two lines that has been added twice, and data of two lines that has been added once. The output processor 17 reads the data of two lines that has been added four times among the data of eight lines, and outputs the read data as the image data DT. Thereafter, the TDI processor 15 resets the data of the two lines in the TDI memory 16S read by the output processor 17.

In this manner, the imaging device 1 sets the accumulation period PL having the long time length TL and the accumulation period PS having the short time length TS in the time-division and alternate manner, and performs the TDI process 100L using the pixel values based on the accumulation result in the accumulation period PL and the TDI process 100S using the pixel values based on the accumulation result in the accumulation period PS, thereby generating the image data DT.

The exposure controller 12 uses, for example, the following expressions to calculate time Tls(1), time Tle(1), time Tss(2), and time Tse(2) indicated in FIG. 5.

$$Tls(n) = Tf(n) - TL/2 - TS/2$$

$$Tle(n) = Tf(n) + TL/2 - TS/2$$

$$Tss(n) = Tf(n) - TS$$

$$Tse(n) = Tf(n)$$

Here, n is a number indicating the number of cycles. Tf(n) is a synchronization interval illustrated in FIG. 5 and is measured by the exposure controller 12. TL is a time length of the accumulation period PL and is stored, for example, in a control register. TS is a time length of the accumulation period PS and is stored, for example, in the control register. Data of the time lengths TL and TS stored in the control register is desirably changeable. This makes it possible to adjust the dynamic range depending on, for example, brightness of a subject.

Using those equations, time Tls(1), time Tle(1), time Tss(2), and time Tse(2) are as follows.

$$Tls(1) = Tf(1) - TL/2 - TS/2$$

$$Tle(1) = Tf(1) + TL/2 - TS/2$$

$$Tss(2) = Tf(2) - TS$$

$$Tse(2) = Tf(2)$$

For example, the exposure controller 12 measures the synchronization interval Tf(1) of between timing t1 and timing t11 on the basis of the synchronization signal SYNC, and calculates time Tls(1) and Tle(1) using the synchronization interval Tf(1) and the time lengths TL and TS stored in the control register. The exposure controller 12 thus sets the accumulation period PL having the long time length TL. In a similar manner, the exposure controller 12 measures the synchronization interval Tf(2) of between timing t11 and timing t21 on the basis of the synchronization signal SYNC, and calculates time Tss(2) and time Tse(2) using the synchronization interval Tf(2) and the time length TS stored in the control register. The exposure controller 12 thus sets the accumulation period PS having the short time length TS.

Here, central timing tlc(n) of the accumulation period PL and central timing tsc(n) of the accumulation period PS are expressed as follows.

$$Tlc(n) = (Tls(n) + Tle(n))/2 = Tf(n) - TS/2$$

$$Tsc(n) = (Tss(n) + Tse(n))/2 = Tf(n) - TS/2$$

Thus, as illustrated in FIG. 5(E): time between the central timing of the accumulation period PL having the long time length TL of between timing t13 and timing t14 and the central timing of the accumulation period PS having the time length TS of between timing t23 and timing t24 is equal to time of the synchronization interval Tf; and time between the central timing of the accumulation period PS having the time length TS of between timing t23 and timing t24 and the central timing of the accumulation period PL having the long time length TL of between timing t33 and timing t34 is equal to time of the synchronization interval Tf. In other words, the time length between the respective central timings of the accumulation periods P (the accumulation periods PL and PS) that are adjacent to each other on a time axis is equal to the time of the synchronization interval Tf and is constant. As a result, in the imaging device 1, it is possible to suppress deviation between a position of the center of gravity of the subject 9 in the image DL generated by the TDI process 100L and a position of the center of gravity of the subject 9 in the image DS generated by the TDI process 100S, as will be described below.

FIG. 7 is an example of the image DL generated by the TDI process 100L and the image DS generated by the TDI process 100S. As illustrated in FIG. 5, the time length TL of the accumulation period PL is longer than the time length TS of the accumulation period PS. Thus, in the image DL generated by the TDI process 100L, the subject 9 is slightly wider in a moving direction (a horizontal direction in FIG. 7) of the subject 9 as compared with the image DS generated by the TDI process 100S. As illustrated in FIG. 7, the position of the center of gravity of the subject 9 in the image DL generated by the TDI process 100L and the position of the center of gravity of the subject 9 in the image DS generated by the TDI process 100S coincides with each other in the moving direction of the subject 9. In other words, as illustrated in FIG. 5, in the imaging device 1, the time length between the respective central timings of the accumulation periods P that are adjacent to each other on the time axis is equal to the time of the synchronization interval Tf and is constant. Accordingly, it is possible to make the position of the center of gravity of the subject 9 in the image DL and the position of the center of gravity of the subject 9 in the image DS to coincide with each other. Thus, the HDR processor 94 at a subsequent stage in the imaging device 1 is able to combine the image DL and the image DS whose positions of the center of gravity coincide with each other as they are by the HDR process. This makes it possible to enhance the quality of the image generated by the HDR process as compared with comparative examples described below.

Next, effects of the present embodiment will be described in comparison with some comparative examples.

First Comparative Example

First, an imaging device 1R according to a first comparative example will be described. The imaging device 1R is configured to set the accumulation period PS having the short time length TS for the pixel lines L1 to L4 of the pixel array 11, and set the accumulation period PL having the long time length TL for the pixel lines L5 to L8 of the pixel array 11. The imaging device 1R includes an exposure controller 12R and a TDI processor 15R in a manner similar to the imaging device 1 (FIG. 2) according to the present embodiment.

FIG. 8 is an example of the TDI process to be performed in the imaging device 1R. The exposure controller 12R sets the accumulation period PS having the short time length TS for the pixel lines L1 to L4 of the pixel array 11, and sets the accumulation period PL having the long time length TL for the pixel lines L5 to L8 of the pixel array 11. Accordingly, the images P1 to P8 each include: an image which is enclosed by the solid line in FIG. 8 and is generated on the basis of the accumulation result in the accumulation period PS having the short time length TS; and an image which is enclosed by the dashed line in FIG. 8 and is generated on the basis of the accumulation result in the accumulation period PL having the long time length TL.

The TDI processor 15R performs a TDI process 100RS using the pixel values based on the accumulation result in the accumulation period PS. In this example, the TDI processor 15R performs the TDI process 100RS by adding, in units of pixels, the line image related to the most upstream pixel line L1 in the image P1, the line image related to the second pixel line L2 in the image P2, the line image related to the third pixel line L3 in the image P3, and the line image related to the fourth pixel line L4 in the image P4.

In a similar manner, the TDI processor 15R performs a TDI process 100RL using the pixel values based on the accumulation result in the accumulation period PL. In this example, the TDI processor 15R performs the TDI process 100RL by adding, in units of pixels: the line image related to the fifth pixel line L5 in the image P5, the line image related to the sixth pixel line L6 in the image P6, the line image related to the seventh pixel line L7 in the image P7, and the line image related to the most downstream pixel line L8 in the image P8.

FIG. 9 illustrates an example of the accumulation period P in the imaging device 1R, in which (A) indicates the waveform of the synchronization signal SYNC, and (B) indicates the accumulation operation performed in the pixel array 11. The exposure controller 12R sets the accumulation period PL having the long time length TL and the accumulation period PS having the short time length TS on the basis of the synchronization signal SYNC. Specifically, for example, the exposure controller 12R sets the accumulation period PL that starts at timing t41 and ends at timing t43, and sets the accumulation period PS that starts at timing t42 and ends at timing 43. Also in this example, the time length between the respective central timings of the accumulation periods PL that are adjacent to each other on the time axis is equal to the time of the synchronization interval Tf and is constant, and the time length between the respective central timings of the accumulation periods PS that are adjacent to each other on the time axis is equal to the time of the synchronization interval Tf and is constant.

However, in this example, the central timing of the accumulation period PL and the central timing of accumulation period PS are deviated from each other. As a result, in the imaging device 1R, as illustrated in FIG. 10, a deviation Δ occurs between the position of the center of gravity of the subject 9 in the image DL generated by the TDI process 100RL and the position of the center of gravity of the subject 9 in the image DS generated by the TDI process 100RS. Accordingly, the HDR processor 94 at a subsequent stage in the imaging device 1R first has to perform an image correction process on the basis of the images DL and DS in such a manner that the positions of the center of gravity of the subject 9 coincide with each other, and to combine the two corrected images by the HDR process. Thus, the image correction process may reduce the image quality.

Further, the imaging device 1R sets the accumulation period PS having the short time length TS for the pixel lines L1 to L4 of the pixel array 11, and sets the accumulation period PL having the long time length TL for the pixel lines L5 to L8 of the pixel array 11. Accordingly, the pixel controller 13 has to control, for example, the accumulation operation of the plurality of light-receiving pixels PIX included in the pixel lines L1 to L4 and the accumulation operation of the plurality of light-receiving pixels PIX included in the pixel lines L5 to L8 by using different control signals. As a result, for example, a wiring line of the control signal in the pixel array 11 can become complicated. In particular, in a linear sensor, it is desirable that the light-receiving pixels PIX are disposed closely to each other. In this case, in the pixel array 11, space for the wiring line between the light-receiving pixels PIX decreases, for example. It is thus difficult to dispose the wiring line. For example, in a case where a complicated wiring line is provided, this can affect the image quality.

In contrast, the imaging device 1 according to the present embodiment is able to make the position of the center of gravity of the subject 9 in the image DL and the position of the center of gravity of the subject 9 in the image DS to coincide with each other. The HDR processor 94 is thus able to combine the image DL and image DS whose positions of the center of gravity coincide with each other as they are by the HDR process, without performing the image correction process. This makes it possible to enhance the quality of the image generated by the HDR process. Further, the imaging device 1 sets the accumulation period PL or the accumulation period PS in a time-division manner for all pixel lines L1 to L8 included in the pixel array 11. The pixel controller 13 is thus able to control the accumulation operation of all light-receiving pixels PIX using the same control signal, for example. This makes it possible to simplify the wiring line of the control signal in the pixel array 11, and to reduce a possibility of decreasing the image quality due to the complicated wiring line.

Second Comparative Example

Next, an imaging device 1S according to a second comparative example will be described. In the imaging device 1S is obtained by changing timings of the exposure periods PL and TS in the imaging device 1R according to the first comparative example. The imaging device 1S includes the exposure controller 12S and the TDI processor 15S in a manner similar to the imaging device 1 (FIG. 2) according to the present embodiment.

FIG. 11 is an example of the accumulation period P in the imaging device 1S. The exposure controller 12S sets the accumulation period PL having the long time length TL and the accumulation period PS having the short time length TS on the basis of the synchronization signal SYNC. Specifically, for example, the exposure controller 12S sets the accumulation period PL that starts at timing t51 and ends at timing t54, and sets the accumulation period PS that starts at timing t52 and ends at timing t53. In this example, the central timing of the accumulation period PL and the central timing of the accumulation period PS are made to coincide with each other. Accordingly, in the imaging device 1S, it is possible to make the position of the center of gravity of the subject 9 in the image DL and the position of the center of gravity of the subject 9 in the image DS to coincide with each other in a manner similar to the case of the imaging device 1 (FIG. 7) according to the present embodiment.

However, in this case, the plurality of light-receiving pixels PIX included in the pixel lines L1 to L4 starts the AD conversion operation from timing t53 at which the accumulation period PS ends, and the plurality of light-receiving pixels PIX included in the pixel lines L5 to L8 starts the AD conversion operation from timing t54 at which the accumulation period PL ends. Accordingly, the pixel controller 13 has to control, for example, the AD conversion operation of the plurality of light-receiving pixels PIX included in the pixel lines L1 to L4 and the AD conversion operation of the plurality of light-receiving pixels PIX included in the pixel lines L5 to L8 by using different control signals. Thus, for example, a wiring line of the control signal in pixel array 11 can become complicated. For example, in a case where a complicated wiring line is provided, this can affect the image quality. Further, since the timings of the AD conversion operation are different from each other in this manner, for example, power supply noise caused by the AD conversion operation related to the plurality of light-receiving pixels PIX included in the pixel lines L1 to L4 can affect the accumulation operation of the plurality of light-receiving pixels PIX included in the pixel lines L5 to L8, and the image quality can be reduced.

In contrast, the imaging device 1 according to the present embodiment sets the accumulation period PL or the accumulation period PS in a time-division manner for all pixel lines L1 to L8 included in the pixel array 11, and is thus able to make timings of the AD conversion operation in the plurality of light-receiving pixels PIX included in all pixel lines L1 to L8. The pixel controller 13 is thus able to control the AD conversion operation of all light-receiving pixels PIX using the same control signal, for example. This makes it possible to simplify the wiring line of the control signal in the pixel array 11, and to reduce a possibility of decreasing the image quality due to the complicated wiring line. In addition, since it is possible to make the timings of the AD conversion operation to coincide with each other in this manner, the power supply noise generated by the AD conversion operation of a certain light-receiving pixel PIX does not affect the accumulation operation of another light-receiving pixel PIX. Thus, it is possible to decrease the possibility of the image quality being reduced.

In this manner, the imaging device 1 sets the time length of the accumulation period P to one of the short time length TS or the long time length TL in the time-division and alternate manner, and performs the accumulation operation in which each of the plurality of light-receiving pixels PIX included in the pixel array 11 accumulates the electric charge corresponding to the light-receiving amount in the accumulation period P. Thereafter, for example, as illustrated in FIG. 4A, the plurality of pixel values based on the accumulation result in the pixel line L1 in the accumulation period PS having the short time length TS and the plurality of pixel values based on the accumulation result in the pixel line L3 in another accumulation period PS are added to each other, and, for example, as illustrated in FIG. 4B, the plurality of pixel values based on the accumulation result in the pixel line L1 in the accumulation period PL having the long time length TL and the plurality of pixel values based on the accumulation result in the pixel line L3 in another accumulation period PL are added to each other, thereby generating the image data DT. If the accumulation period P is the accumulation period PS having the short time length TS, the pixel array 11 is able to image the bright portion of the subject 9 with high image quality, for example, and if the accumulation period P is the accumulation period PL having the long time length TL, the pixel array 11 is able to image a dark portion of the subject 9 with high image quality, for example. Accordingly, the imaging device 1 is able to achieve the wide dynamic range. Further, the imaging device 1 adds the plurality of pixel values by the TDI process, and is thus able to enhance the sensitivity. As a result, the imaging device 1 is able to enhance the image quality.

In particular, the imaging device 1 alternately sets the time length of the accumulation time P to one of the short time length TS or the long time length TL. The imaging device 1 is thus able to simplify the wiring line in the pixel array 11, and to decrease the possibility of the image quality being reduced due to the complicated wiring line. In addition, since the power supply noise generated by the AD conversion operation does not affect the accumulation operation, it is possible to enhance the image quality.

Further, in the imaging device 1, the time length between the respective central timings of two accumulation periods P that are adjacent to each other on the time axis is made constant. The imaging device 1 is thus able to make the position of the center of gravity of the subject 9 in the image DL generated by the TDI process 100L and the position of the center of gravity of the subject 9 in the image DS generated by the TDI process 100S to coincide with each other. Accordingly, for example, in the case of combining the image DL and the image DS by the HDR process, it is possible to combine the image DL and the image DS as they are without performing the image correction process of adjusting the position of the center of gravity position. This makes it possible to enhance the image quality of the image generated by the HDR process.

Effects

As described above, in the present embodiment, the time length of the accumulation period is alternately set to one of the short time length or the long time length, and the plurality of light-receiving pixels included in the pixel array performs the accumulation operation of accumulating the electric charge corresponding to the light-receiving amount in the accumulation period. Thereafter, for example, the plurality of pixel values based on the accumulation result in the pixel line L1 in the accumulation period PS having the short time length and the plurality of pixel values based on the accumulation result in the pixel line L3 in another accumulation period PS are added to each other, and, for example, the plurality of pixel values based on the accumulation result in the pixel line L1 in the accumulation period PL having the long time length and the plurality of pixel values based on the accumulation result in the pixel line L3 in another accumulation period PL are added to each other, thereby generating the image data. As a result, it is possible to enhance the image quality.

In the present embodiment, the time length between the respective central timings of two accumulation periods P that are adjacent to each other on the time axis is made constant. This makes it possible to enhance the image quality.

Modification Example 1

In the embodiment described above, the accumulation period PS having the short time length TS and the accumulation period PL having the long time length TL are set alternately; however, the present disclosure is not limited thereto, and, for example, it is possible to set the accumulation period PS and the accumulation period PL in predetermined order. Hereinafter, an imaging device 1A according to the present modification example will be described in detail. The imaging device 1A includes an exposure controller 12A and a TDI processor 15A in a manner similar to the imaging device 1 (FIG. 2) according to the present embodiment.

FIG. 12 illustrates an example of the accumulation period P of the imaging device 1A. FIG. 13 illustrates an example of the TDI process to be performed by the imaging device 1A.

As illustrated in FIG. 12, the exposure controller 12A sets, on the basis of the synchronization signal SYNC, the accumulation period PS, the accumulation period PS, the accumulation period PL, and the accumulation period PL, in this order repeatedly. Specifically, for example, the exposure controller 12A sets the accumulation period PS that starts at timing t61 and ends at timing t62, sets the accumulation period PS that starts at timing t63 and ends at timing t64, sets the accumulation period PL that starts at timing t65 and ends at timing t66, and sets the accumulation period PL that starts at timing t67 and ends at timing t68. Also in this example, the time length between the respective central timings of the accumulation periods P that are adjacent to each other on the time axis is equal to the time of the synchronization interval Tf and is constant.

In FIG. 13, the images P1, P2, P5, and P6 each enclosed by the solid line are each the image generated on the basis of the accumulation result in the accumulation period PS having the short time length TS, and the images P3, P4, P7, and P8 each enclosed by the dashed line are each the image generated on the basis of the accumulation result in the exposure time PL having the long time length TL.

The TDI processor 15A performs the TDI process 100S using the pixel values based on the accumulation result in the accumulation period PS. In this example, the TDI processor 15A performs the TDI process 100S by adding, in units of pixels, the line image related to the most upstream pixel line L1 in the image P1, the line image related to the second pixel line L2 in the image P2, the line image related to the fifth pixel line L5 in the image P5, and the line image related to the sixth pixel line L6 in the image P6.

In a similar manner, the TDI processor 15A performs the TDI process 100L using the pixel values based on the accumulation result in the accumulation period PL. In this example, the TDI processor 15A performs the TDI process 100L by adding, in units of pixels, the line image related to the third pixel line L3 in the image P3, the line image related to the fourth pixel line L4 in the image P4, the line image related to the seventh pixel line L7 in the image P7, and the line image related to the most downstream pixel line L8 in the image P8.

Modification Example 2

In the embodiment described above, the two accumulation periods PS and PL are set alternately; however, the present disclosure is not limited thereto, and, for example, three or more accumulation periods P may be set in predetermined order. Hereinafter, an imaging device 1B according to the present modification example will be described in detail. The imaging device 1B includes a pixel array 11B, and an exposure controller 12B, and a TDI processor 15B in a similar manner to the imaging device 1 (FIG. 2) according to the present embodiment. The plurality of light-receiving pixels PIX included in the pixel array 11B is separated into six pixel lines L in this example.

FIG. 14 illustrates an example of the accumulation period P of the imaging device 1B. FIG. 15 illustrates an example of the TDI process to be performed by the imaging device 1B.

As illustrated in FIG. 14, the exposure controller 12A sets, on the basis of the synchronization signal SYNC, the accumulation period PS having the short time length TS, an accumulation period PM having a medium time length TM, and the accumulation period PL having the long time length TL in this order repeatedly. Also in this example, the time length between the respective central timings of the accumulation periods P that are adjacent to each other on the time axis is equal to the time of the synchronization interval Tf and is constant.

In FIG. 15, the images P1 and P4 each enclosed by the solid line are each the image generated on the basis of the accumulation result in the accumulation period PS having the short time length TS, the images P2 and P5 each enclosed by a long dashed line are each an image generated on the basis of an accumulation result in the exposure time PM having the medium time length TM, and the images P3 and P6 each enclosed by a short dashed line are each the image generated on the basis of the accumulation result in the accumulation period PL having the long time length TL.

The TDI processor 15B performs the TDI process 100S using the pixel values based on the accumulation result in the accumulation period PS. In this example, the TDI processor 15B performs the TDI process 100S by adding, in units of pixels, the line image related to the most upstream pixel line L1 in the image P1 and the line image related to the fourth pixel line L4 in the image P4.

In a similar manner, the TDI processor 15B performs a TDI process 100M using the pixel values based on the accumulation result in the accumulation period PM. In this example, the TDI processor 15B performs the TDI process 100M by adding, in units of pixels, the line image related to the second pixel line L2 in the image P2 and the line image related to the fifth pixel line L5 in the image P5.

In a similar manner, the TDI processor 15B performs the TDI process 100L using the pixel values based on the accumulation result in the accumulation period PL. In this example, the TDI processor 15B performs the TDI process 100L by adding, in units of pixels, the line image related to the third pixel line L3 in the image P3 and the line image related to the sixth pixel line L6 in the image P6.

Modification Example 3

In the embodiment described above, the light-receiving pixel PIX performs the accumulation operation and the AD conversion operation; however, the present disclosure is not limited thereto. Alternatively, for example, a circuit that performs the AD conversion operation may be provided separately from the light-receiving pixel. Hereinafter, an imaging device 1C according to the present modification example will be described in detail.

FIG. 16 illustrates a configuration example of the imaging device 1C. The imaging device 1C includes a pixel array 11C, an exposure controller 12C, a pixel controller 13C, a GS (Global Shutter) memory 14C, and an AD converter 18C.

The pixel array 11C includes a plurality of light-receiving pixels PIXC arranged in a matrix. Each of the plurality of light-receiving pixels PIXC performs the accumulation operation of accumulating the electric charge corresponding to the light-receiving amount in the accumulation period P. In other words, although the light-receiving pixel PIX according to the above-described embodiment performs the accumulation operation and the AD conversion operation, the light-receiving pixel PIXC according to the present modification example performs only the accumulation operation. The accumulation operation in the plurality of light-receiving pixels PIX is to be performed on the basis of an instruction from the pixel controller 13C.

The exposure controller 12C is configured to control the accumulation operation to be performed in the pixel array 11C on the basis of the synchronization signal SYNC supplied from the conveyance controller 92 (FIG. 1). Specifically, the exposure controller 12C sets, in the time-division and alternate manner, the accumulation period PL having the long time length TL and the accumulation period PS having the short time length TS on the basis of the synchronization signal SYNC. The exposure controller 12C thereafter generates the exposure-start signal SST indicating the start timing of the accumulation period P and the exposure-end signal SED indicating the end timing of the accumulation period P, and supplies the pixel controller 13C with those signals. Further, the exposure controller 12C generates the exposure-kind signal EX indicating which of the process with respect to the accumulation result in the accumulation time PL or the process with respect to the accumulation result in the accumulation time PS is to be performed, and supplies the TDI processor 15 with the exposure-kind signal EX.

The pixel controller 13C is configured to control the accumulation operation by driving the plurality of light-receiving pixels PIXC included in the pixel array 11C on the basis of the exposure-start signal SST and the exposure-end signal SED supplied from the exposure controller 12C. Further, after the accumulation operation is completed, the pixel controller 13C also has a function of controlling an operation of transferring the electric charge accumulated in the plurality of light-receiving pixels PIXC to the GS memory 14C.

The GS memory 14C is an analog memory, is provided in the vicinity of the pixel array 11C, and is configured to temporarily store the electric charge supplied from the plurality of light-receiving pixels PIX included in the pixel array 11C.

The AD converter 18C is configured to generate a plurality of pixel values of one line by performing AD conversion on the basis of the electric charge of the one line which is read from the GS memory 14C. Here, the AD converter 18C corresponds to a specific example of an "AD converter" according to the present disclosure.

Modification Example 4

In the embodiment described above, the imaging device 1 outputs the image data DT including the image DL generated by the TDI process 100L and the image DS generated by the TDI process 100S, and the HDR processor 94 that is provided separately from the imaging device 1 performs the HDR process on the basis of the image data DT; however, the present disclosure is not limited thereto. Alternatively, for example, as in an imaging device 1D illustrated in FIG. 17, an HDR processor 19D may be provided in the imaging device 1D, and the HDR processor 19D may perform the HDR process on the basis of the image data DT and output image data DT2 generated by the HDR process.

Other Modification Examples

Further, two or more of the modification examples may be combined.

Although the disclosure is described hereinabove with reference to the example embodiments and modification examples, these embodiments and modification examples are not to be construed as limiting the scope of the disclosure and may be modified in a wide variety of ways.

For example, in the above-described embodiment, although the pixel array 11 is provided with eight pixel lines L, the present disclosure is not limited thereto, and instead, for example, the number of the plurality of pixel lines L may be seven or less, or may be nine or more.

For example, in the above-described embodiment, the imaging device 1 performs the imaging operation each time the image of the subject 9 progresses by one pixel line L on the imaging plane S on the basis of the synchronization signal SYNC; however, the present disclosure is not limited thereto. Alternatively, for example, the imaging device may perform the imaging operation each time the image of the subject 9 progresses by two or more pixel lines L on the imaging plane S.

For example, in the above-described embodiment, as illustrated in FIG. 1, the conveyance controller 92 generates the synchronization signal SYNC, and the imaging device 1 performs the imaging operation on the basis of the synchronization signal SYNC; however, the present disclosure is not limited thereto. Alternatively, for example, the imaging device may generate the synchronization signal SYNC and perform the imaging operation on the basis of the synchronization signal SYNC, and the conveyance controller may control the conveyance operation of the belt conveyor 91 on the basis of the synchronization signal SYNC.

For example, in the above-described embodiment, as illustrated in FIG. 1, the imaging device 1 is fixed and the subject 9 is moved; however, the present disclosure is not limited thereto. Alternatively, for example, the subject 9 may be fixed and the imaging device 1 may be moved.

It should be appreciated that the effects described herein are mere examples and are not limited to those described herein. The disclosure may further include any effects other than those described herein.

It is to be noted that the present technology may have the following configurations. According to the present technology having the following configurations, it is possible to enhance image quality.

(1)

An imaging device including:

a pixel array including a plurality of light-receiving pixels, the plurality of light-receiving pixels being separated into a plurality of pixel lines and accumulating electric charge corresponding to a light-receiving amount in an accumulation period, the plurality of pixel lines including a first pixel line and a second pixel line arranged in parallel in a first direction;

an exposure controller that sets a time length of the accumulation period in the plurality of light-receiving pixels to one of a plurality of time lengths including a first time length and a second time length in a manner that the plurality of time lengths repeat in predetermined order; and a processor that generates image data on a basis of an accumulation result in the plurality of light-receiving pixels, in which the accumulation period includes a first accumulation period and a second accumulation period each having the first time length, and a third accumulation period and a fourth accumulation period each having the second time length, and the processor generates the image data by adding a plurality of pixel values based on the accumulation result in the first pixel line in the first accumulation period and a plurality of pixel values based on the accumulation result in the second pixel line in the second accumulation period, and adding a plurality of pixel values based on the accumulation result in the first pixel line in the third accumulation period and a plurality of pixel values based on the accumulation result in the second pixel line in the fourth accumulation period.

(2)

The imaging device according to (1), in which a time length between respective central timings of two of the accumulation periods that are adjacent to each other is constant.

(3)

The imaging device according to (1) or (2), in which the exposure controller changes the time length of the accumulation period each time a predetermined period elapses, and a timing difference between a central timing of the first accumulation period and a central timing of the third accumulation period is equal to a time length of the predetermined period.

(4)

The imaging device according to (3), in which the exposure controller sets the time length of the accumulation period on a basis of a synchronization signal supplied from an outside.

(5)

The imaging device according to (4), in which the synchronization signal includes a plurality of pulses including a first pulse and a second pulse, and the exposure controller sets a start timing of the first accumulation period and an end timing of the first accumulation period on a basis of the first pulse, and sets a start timing of the third accumulation period and an end timing of the third accumulation period on a basis of the second pulse.

(6)

The imaging device according to any one of (1) to (5), in which the processor includes a first storage associated with the first time length, and a second storage associated with the second time length, uses the first storage to add the plurality of pixel values based on the accumulation result in the first pixel line in the first accumulation period and the plurality of pixel values based on the accumulation result in the second pixel line in the second accumulation period, and uses the second storage to add the plurality of pixel values based on the accumulation result in the first pixel line in the third accumulation period and the plurality of pixel values based on the accumulation result in the second pixel line in the fourth accumulation period.

(7)

The imaging device according to any one of (1) to (6), in which the image data includes first image data based on the accumulation result in the accumulation period having the first time length and second image data based on the accumulation result in the accumulation result having the second time length.

(8)

The imaging device according to any one of (1) to (7), in which each of the plurality of light-receiving pixels converts an analog signal corresponding to the electric charge accumulated in the accumulation period into the pixel value which is a digital value.

(9)

The imaging device according to (8), in which each of the plurality of light-receiving pixels accumulates the electric charge corresponding to the light-receiving amount in the accumulation period, and converts, in a predetermined period after the accumulation period, the analog signal corresponding to the electric charge accumulated in the accumulation period into the pixel value which is the digital value.

(10)

The imaging device according to any one of (1) to (7), further including an AD converter that converts an analog signal corresponding to the electric charge accumulated in each of the plurality of light-receiving pixels into the pixel value which is a digital value.

(11)

The imaging device according to any one of (1) to (10), in which the exposure controller sets the accumulation period each time an image of a subject progresses in the first direction by a predetermined number of pixel lines on an imaging plane of the pixel array.

This application claims the benefit of Japanese Priority Patent Application JP2020-108113 filed with the Japan Patent Office on Jun. 23, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device comprising:

a pixel array including a plurality of light-receiving pixels, the plurality of light-receiving pixels being separated into a plurality of pixel lines and accumulating electric charge corresponding to a light-receiving amount in an accumulation period, the plurality of pixel lines including a first pixel line and a second pixel line arranged in parallel in a first direction;

an exposure controller that sets a time length of the accumulation period in the plurality of light-receiving pixels to one of a plurality of time lengths including a first time length and a second time length in a manner that the plurality of time lengths repeat in predetermined order; and a processor that generates image data on a basis of an accumulation result in the plurality of light-receiving pixels, wherein the accumulation period includes a first accumulation period and a second accumulation period each having the first time length, and a third accumulation period and a fourth accumulation period each having the second time length, and the processor generates the image data by adding a plurality of pixel values based on the accumulation result in the first pixel line in the first accumulation period and a plurality of pixel values based on the accumulation result in the second pixel line in the second accumulation period, and adding a plurality of pixel values based on the accumulation result in the first pixel line in the third accumulation period and a plurality of pixel values based on the accumulation result in the second pixel line in the fourth accumulation period.

2. The imaging device according to claim 1, wherein a time length between respective central timings of two of the accumulation periods that are adjacent to each other is constant.

3. The imaging device according to claim 1, wherein
the exposure controller changes the time length of the accumulation period each time a predetermined period elapses, and
a timing difference between a central timing of the first accumulation period and a central timing of the third accumulation period is equal to a time length of the predetermined period.

4. The imaging device according to claim 3, wherein the exposure controller sets the time length of the accumulation period on a basis of a synchronization signal supplied from an outside.

5. The imaging device according to claim 4, wherein
the synchronization signal includes a plurality of pulses including a first pulse and a second pulse, and
the exposure controller
sets a start timing of the first accumulation period and an end timing of the first accumulation period on a basis of the first pulse, and
sets a start timing of the third accumulation period and an end timing of the third accumulation period on a basis of the second pulse.

6. The imaging device according to claim 1, wherein the processor
includes
a first storage associated with the first time length, and
a second storage associated with the second time length,
uses the first storage to add the plurality of pixel values based on the accumulation result in the first pixel line in the first accumulation period and the plurality of pixel values based on the accumulation result in the second pixel line in the second accumulation period, and
uses the second storage to add the plurality of pixel values based on the accumulation result in the first pixel line in the third accumulation period and the plurality of pixel values based on the accumulation result in the second pixel line in the fourth accumulation period.

7. The imaging device according to claim 1, wherein the image data includes first image data based on the accumulation result in the accumulation period having the first time length and second image data based on the accumulation result in the accumulation result having the second time length.

8. The imaging device according to claim 1, wherein each of the plurality of light-receiving pixels converts an analog signal corresponding to the electric charge accumulated in the accumulation period into the pixel value which is a digital value.

9. The imaging device according to claim 8, wherein each of the plurality of light-receiving pixels accumulates the electric charge corresponding to the light-receiving amount in the accumulation period, and converts, in a predetermined period after the accumulation period, the analog signal corresponding to the electric charge accumulated in the accumulation period into the pixel value which is the digital value.

10. The imaging device according to claim 1, further comprising an AD converter that converts an analog signal corresponding to the electric charge accumulated in each of the plurality of light-receiving pixels into the pixel value which is a digital value.

11. The imaging device according to claim 1, wherein the exposure controller sets the accumulation period each time an image of a subject progresses in the first direction by a predetermined number of pixel lines on an imaging plane of the pixel array.

* * * * *